(12) United States Patent
Jakobsson

(10) Patent No.: US 11,886,581 B1
(45) Date of Patent: Jan. 30, 2024

(54) RAPID VERIFICATION OF EXECUTING PROCESSES

(71) Applicant: Security Technology, LLC, New York, NY (US)

(72) Inventor: Bjorn Markus Jakobsson, New York, NY (US)

(73) Assignee: Security Technology, LLC, New York, NY (US)

( * ) Notice: Subject to any disclaimer, the term of this patent is extended or adjusted under 35 U.S.C. 154(b) by 248 days.

(21) Appl. No.: 16/926,546

(22) Filed: Jul. 10, 2020

Related U.S. Application Data

(63) Continuation of application No. 15/727,089, filed on Oct. 6, 2017, now Pat. No. 10,747,878.

(60) Provisional application No. 62/405,745, filed on Oct. 7, 2016.

(51) Int. Cl.
   *G06F 21/56* (2013.01)
   *H04L 9/40* (2022.01)

(52) U.S. Cl.
   CPC ............ *G06F 21/56* (2013.01); *H04L 63/145* (2013.01); *G06F 2221/034* (2013.01)

(58) Field of Classification Search
   CPC .... G06F 21/56; G06F 2221/034; G06F 21/64; G06F 21/445; G06F 21/72; G06F 21/44; G06F 21/6245; H04L 63/145; H04L 9/3247; H04L 9/3236; H04L 9/0643; H04L 63/12
   See application file for complete search history.

(56) References Cited

U.S. PATENT DOCUMENTS

| | | | | |
|---|---|---|---|---|
| 7,672,457 | B2 * | 3/2010 | Nagano | H04L 63/062 |
| | | | | 713/168 |
| 8,661,547 | B1 * | 2/2014 | Kononov | G06F 16/122 |
| | | | | 713/176 |
| 9,083,527 | B1 * | 7/2015 | McCorkendale | H04L 67/125 |
| 9,177,153 | B1 * | 11/2015 | Perrig | G06F 21/57 |
| 9,881,150 | B2 * | 1/2018 | Asokan | H04L 9/3242 |
| 9,985,952 | B2 * | 5/2018 | Ignatchenko | H04W 12/06 |
| 2010/0250952 | A1 * | 9/2010 | Pang | G06Q 20/4097 |
| | | | | 713/176 |
| 2012/0331303 | A1 ‡ | 12/2012 | Andersson | G06F 21/51 |
| | | | | 713/189 |

(Continued)

OTHER PUBLICATIONS

Dries Schellekens, Brecht Wyseur, and Bart Preneel. "Remote attestation on legacy operating systems with trusted platform modules." Science of Computer Programming 74, No. 1-2 (2008): 13-22.‡

(Continued)

*Primary Examiner* — Ali S Abyaneh
(74) *Attorney, Agent, or Firm* — Van Pelt, Yi & James LLP

(57) ABSTRACT

Rapid verification of executing processes includes receiving a seed from a verification unit. A checksum is generated at least in part by using a processor. The processor is coupled to a hierarchical memory, the hierarchical memory comprising an instruction cache, a data cache, and a shared memory accessible by both the instruction cache and the data cache. The shared memory is configured to store an executing program. A size of at least one of the instruction cache and the data cache is insufficient to store the entire executing program. The checksum is transmitted to the verification unit.

23 Claims, 13 Drawing Sheets

(56) References Cited

U.S. PATENT DOCUMENTS

| | | | | |
|---|---|---|---|---|
| 2014/0108800 | A1* | 4/2014 | Lawrence | H04L 63/123 |
| | | | | 713/168 |
| 2014/0195812 | A1* | 7/2014 | Emelko | H04L 9/08 |
| | | | | 713/168 |
| 2015/0278984 | A1* | 10/2015 | Koker | G06F 12/0813 |
| | | | | 345/557 |
| 2015/0373046 | A1‡ | 12/2015 | Sapello | H04L 63/145 |
| | | | | 726/23 |
| 2016/0103683 | A1* | 4/2016 | Ueno | G06F 8/41 |
| | | | | 712/239 |
| 2016/0211971 | A1* | 7/2016 | Lablans | H04L 9/0643 |
| 2018/0011768 | A1* | 1/2018 | Bradbury | G06F 11/1407 |

OTHER PUBLICATIONS

Paul C. Van Oorschot, Anil Somayaji, and Glenn Wurster. "Hardware-assisted circumvention of self-hashing software tamper resistance." IEEE Transactions on Dependable and Secure Computing 2, No. 2 (2005): 82-92.‡

Arvind Seshadri, Mark Luk, Elaine Shi, Adrian Perrig, Leendert Van Doorn, and Pradeep Khosla. "Pioneer: verifying code integrity and enforcing untampered code execution on legacy systems." In ACM SIGOPS Operating Systems Review, vol. 39, No. 5, pp. 1-16. ACM, 2005.‡

Jakobsson et al. Practical and Secure Software-Based Attestation. IEEE Conference. Mar. 14-15, 2011.

Li et al. SBAP: Software-Based Attestation for Peripherals. Jun. 21-23, 2003.

Seshadri et al. SWATT: SoftWare-based ATTestation for Embedded Devices. Jun. 2004.

* cited by examiner
‡ imported from a related application

RAPID VERIFICATION OF EXECUTING PROCESSES

CROSS REFERENCE TO OTHER APPLICATIONS

This application is a continuation of U.S. patent application Ser. No. 15/727,089, entitled RAPID VERIFICATION OF EXECUTING PROCESSES filed Oct. 6, 2017 which is incorporated herein by reference for all purposes, which claims priority to U.S. Provisional Application No. 62/405,745, entitled RAPID VERIFICATION OF EXECUTING PROCESSES filed Oct. 7, 2016 which is incorporated herein by reference for all purposes.

BACKGROUND OF THE INVENTION

In some situations, it may be desirable for a first computational entity to be able to determine whether a second computational entity is running a known process or program, and no other processes. Being able to determine this may be usable to verify that a target system is free from malware.

However, determining whether the second computational entity is running a known process, and no other processes, can be challenging, since, for example, the second computational entity, if running malware, may intentionally provide incorrect responses to queries from the first computational entity with the goal of causing the first computational entity to determine that the second computational entity is free from malware.

BRIEF DESCRIPTION OF THE DRAWINGS

Various embodiments of the invention are disclosed in the following detailed description and the accompanying drawings.

DETAILED DESCRIPTION

Figure 1:
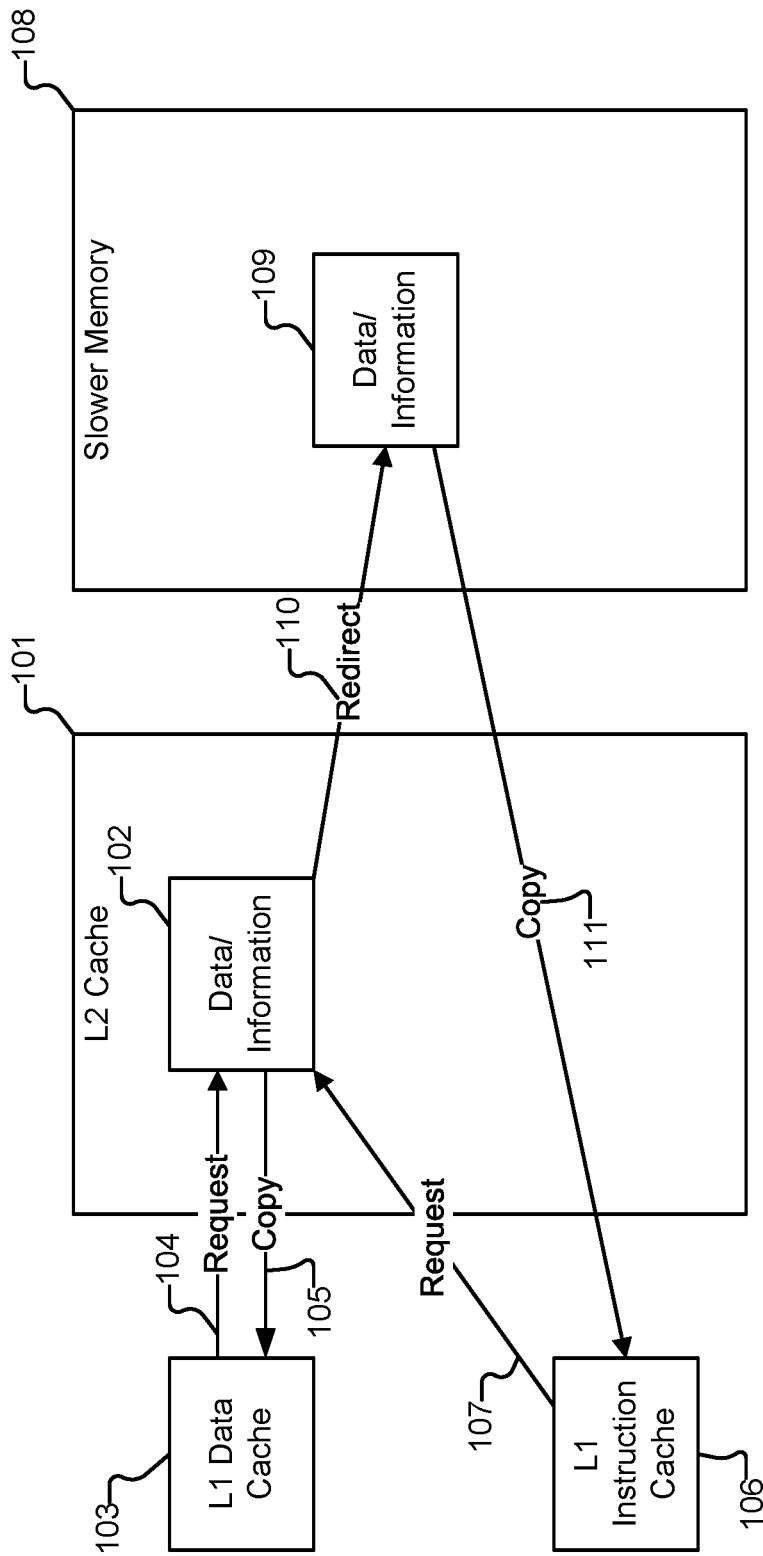
FIG. 1 illustrates an example embodiment of an attempted data substitution attack based on redirection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An example of a system infected by malware is one that is running software that it should not be running. Existing techniques to audit a device involve performing a complex computation (e.g., a checksum), whose result, along with the time it took to perform, is verified. Examples of target systems that can be audited include devices such as a phone, a Scala network (e.g., controlled network or infrastructure), etc. It would be beneficial for an auditing technique to take into account the property that either the malware (if present) generates a result that is correct, but takes longer time to do so than expected; or generates a result in the expected amount of time, but where this result is highly unlikely to be correct.

One solution is a piece of software that checksums itself (e.g., hashes itself). The checksum program/software may include the three following parts: setup, a main checksum loop or process, and a payload. The main loop may include checksum operations that are iteratively executed. The setup may include an initial seed, to turn interrupts off, etc. The payload may be to access a resource such as a file system, as well as actions to perform, such as scanning the file system, reporting on the files in the file system (e.g., by checking on their hashes), etc.

While the adversary will not modify the main loop checksum operations (which would result in the incorrect checksum being computed), the adversary may modify the setup of the legitimate version and/or modify the payload of the legitimate version of the auditing/verification program.

For example, suppose that after the legitimate checksum process is completed, a token, such as a decryption key, is received that allows access to a resource (e.g., an area of memory decrypted using the received key). The malicious process may change how the resource is accessed, or insert an unwanted routine to be performed upon access to the resource. As another example, the legitimate process may include an instruction to turn interrupts off, while the malicious version of the process turns interrupts on, which would allow malicious routines to be performed. Suppose that the legitimate process, upon successful computation of the checksum, is configured to access a recently decrypted area to read a file system to determine whether there are any programs that should not be there. Since the legitimate process has turned off interrupts, there should be no other processes running. Thus, the legitimate process may evaluate or scan the file system to determine what files in the system should be allowed, and which ones are not allowed. Malware would attempt to prevent such scanning of the file system in order to circumvent detection and prevent itself from being erased.

If the piece of software has been modified by a malicious attacker, then hashing itself may be used to detect such modifications. In one approach, pseudo-random jumping of the program when reading itself for the hash may be used (where there is no particular structure or pattern used, and the program itself may cover itself with a high probability, statistically speaking). In another approach, a non-heuristic solution is used, in which rather than pseudo-random jumping (where potentially not all portions of the program will be checksummed), all cells of the program are guaranteed to be hit and used in the checksum due to the use of a predictable access pattern.

One potential issue for auditing approaches is for detecting a scenario in which a modified malicious version of the process checksums not itself, but the legitimate version of the checksum process. This would lead to the correct checksum value being computed, but with the undesirable malicious code in control. The malicious code, when executing, would be able to perform such actions that it should not be allowed to do, such as those described above, including turning interrupts off, maliciously using the payload of the checksum process (e.g., using a decryption key to access a resource such as a file system), etc.

In one approach to addressing the aforementioned issue, in addition to the program itself being used as an input to the checksum function, the program counter (which points to an instruction to be executed) and the data pointer (which points to data to be read or executed on) are also used as inputs to the checksum process. This is because in the malicious attack scenario, the program counter would point to the malicious modified code, while the data pointer would point to a different area of memory that stores the legitimate code, whereas in the non-infected scenario, both the program counter and the data pointer should point to or otherwise be in the same area or region of memory. If the program counter and data pointer are used as inputs to the checksum process, the adversary has two options. One is to deal with the fact that the data pointer is wrong, in which case the wrong checksum will be computed. The other option is that prior to each time that the data pointer is used as an input to the checksum, the data pointer is offset in some way. For example, the most significant bit of the data pointer is removed. This would cause the data pointer to toggle back and forth between two areas, where in one area, it reads the legitimate "clean" code, while in the other area, the data pointer would be used as an input to the checksum. As another example, the offset may include performing a subtraction (e.g., to account for a fixed offset). The computation of such an offset would add additional delays to the checksum computation, causing the presence of malware to be detected.

An auditing technique may have several properties that allow for the verification of what processes are running on a target system. Example properties are as follows. A first example property is the ability to be able to establish that there is no possibility for a corrupted system to generate the correct result in the expected time, based, for example, on analysis of the functionality of the code and the hardware it is running on. A second example property is that, for practical reasons, the execution time is very short, or the process of verification may be impractical. A third example property is that from a practical perspective, the error rate of the outcome of the determination is very low, meaning that there is a very low (and well understood) risk of an incorrect conclusion being generated.

The requirements relating to the execution time and the error rate may be contradictory, since the increase of execution time may depend directly on the expected execution time, which means that if the execution time is very short, then the increase caused by malware is also very short, resulting in potential mistakes due to the inherent time (and variance of this time) to communicate between the first and the second entities.

Described herein are techniques for verifying that an expected process is running, and that there are no other processes running, where the computational time is very short when the correct code is running, but dramatically longer if any modification of such code is instead running. This results in low error rates in addition to very short execution times. Moreover, the checksum process of the techniques described herein is analyzed to determine that there is no mechanism that can circumvent the detection of an unwanted process such as malware.

In some embodiments, the rapid verification of executing processes described herein includes performing a computational task on an audited system or entity and communicating the result to a verifying system, where the result is verified. The computational task may take as input a value or a string provided to the audited system by the verifying system, making it impossible to start the computational task until this input is received at the audited system, and providing, from the audited system to the verifying system, the result of the computational task. In some embodiments, the verifying system determines the time between the provision of the input to the receipt of the result to determine that this is less than a threshold number that depends on the hardware associated with the audited system, including, for example, the size of the L1 instruction cache and L1 data cache of the audited system; the instruction set of the audited system; and the clock frequency of the audited system. In addition, in some embodiments, the threshold also depends on the known communication time for messages between the audited system and verifying system. In various embodiments, the verifying system may be firmware or a secure enclave associated with a computer that also houses a general-purpose computational capability that corresponds to the audited system; the two systems may also be associated with different computational devices and connected by a communication channel such as a bus, a cable, Ethernet, or a radio connection, such as Bluetooth or Wifi.

In some embodiments, the computational task involves generating a checksum on the process or program that generates the checksum, where this checksum, in some embodiments, is also a function of the input provided by the verifying entity; and where in one example embodiment, the checksum is a non-linear accumulator. One example of a non-linear accumulator is a cryptographic hash function; however, using this may cause unnecessarily long computational times and alternative checksums that are faster than cryptographic hash functions are described below. By generating a checksum on the process or executing program that generates the checksum, it may be determined whether the checksum program itself has been modified. If the checksum program has been modified, then this is an indication that the audited system has been infected by malware. If it is determined that the checksum program has not been modified and that the checksum program is the only program that is executing on the system, then this is an indication that the targeted system is not infected by malware.

Two example solutions are described below. The first example is an example solution adapted for systems with split caches, and that is usable to counter redirect-based data substitution attacks. The second example is an alternative solution adapted for systems without split caches that provides fast verification if redirect-based data substitution attacks are not possible.

An example solution adapted for systems with split caches.

The following is an example solution adapted for systems with split caches. The example solution described herein for systems with split caches provides increased security as compared to existing techniques.

The example solution for split cache architectures (e.g., that have separate instruction and data caches that have separate memory spaces) described below is similar in many ways to the below example solution adapted for systems without split caches, but may exhibit various differences, which will be described in further detail below.

Typical computation devices have an instruction cache, a data cache, as well as a shared cache. There may be multiple instruction/data caches (e.g., a smaller instruction/data cache and a larger instruction/data cache). The caches may be organized hierarchically.

Existing remote attestation techniques with split caches are vulnerable to a data substitution attack described in P. C. van Oorschot, A. Somayaji, and G. Wurster. Hardware-assisted Circumvention of Self-hashing Software Tamper Resistance. IEEE Trans. Dependable Sec. Comput., 2(2):82-92, 2005 (hereinafter referred to as "van Oorschot et al."), that attacks previous remote attestation techniques developed for computer architectures with separate data and instruction caches. This example data substitution attack causes a malicious checksumming process to compute the checksum of the legitimate checksum process. Here, the two processes may be identical but for the action taken after the checksum is computed and approved: while the legitimate process would perform a desirable action, the malicious process would load and execute an unwanted routine. Via a data substitution attack, a malicious routine is able to run that does not perform a checksum on itself (which would return an incorrect checksum value since the malicious routine is not identical to the legitimate routine), but instead performs a checksum on the legitimate process itself.

While a general version of the data substitution attack may potentially be detected by using the program counter and data pointer as inputs to the checksum computation, as described above, this countermeasure may not block the data substitution attack described by van Oorschot et al. In van Oorschot et al, multiple ways were shown in which an adversary can perform a data substitution attack by stealthily causing the L1 data cache and L1 instruction cache—when reading the same virtual memory location—to load different contents. For example, an instruction cache is used to cache what instructions are being executed, while the data cache is configured to store the data that is being operated on. In the auditing scenario described herein, the program is operating on itself, so if the legitimate process is running, then information from the same legitimate program will be stored in both the instruction cache and the data cache.

One of the examples shown in van Oorschot et al. is based on changing the access control privileges for the checksum process from code to data, thereby causing an exception to be triggered when the processor attempts to load the process into the L1 instruction cache. For example, the adversary causes the status of segments of code relating to the legitimate checksum process to be labeled as non-executable code. The attacker has also placed in memory (e.g., adjacent to the legitimate process or in another area of slower memory) a malicious version of the process. An exception handler instrumented by the adversary modifies the address associated with a triggering read request (i.e., causing a redirect), thereby forcing the malicious process to be loaded. The exception is only triggered by read requests for the instruction cache, and no redirection takes place for read requests for the data cache. For example, because the status of the code of the legitimate process has been labeled as a non-executable, when a read of the process is performed to fetch an instruction to be placed in the instruction cache, an exception or error occurs, as described above. An exception handler, such as a hardware resolver, captures the exception, and redirects the instruction fetch to fetch an instruction from the malicious version of the process. The instruction from the malicious code is then fetched and placed in the instruction cache. Thus, when code execution begins, the instructions read from the instruction cache are those that are from the malicious version of the code. Thus, the malicious code is being executed, as desired by the adversary, and the malicious code is running the checksum on the legitimate process.

The labeling of the code as non-executable does not affect data reads for the data cache, and so the legitimate process will be read into the data cache as desired by the adversary (where the instruction cache is filled with the malicious code due to the redirection as described above, and where the data cache is filled with the legitimate code). Thus, different versions of the checksum process are loaded into the instruction cache and the data cache. In particular, the hardware resolved all of the access of one kind, either of instruction reads or data reads, in one direction (e.g., instruction/code reads to the malicious code), and reads of the other type in the other direction (e.g., data reads to the legitimate process).

By controlling the caches, the caches may be made to believe that they are reading from the same area (and thus the data pointer and program counter would be in the same area), but the redirection would cause a read of an instruction to be redirected to the malicious version, while the read of the data would still be from the legitimate process. This allows a malware version of the checksum process to be stored in the instruction cache while the legitimate version of the process is read into the data cache. Thus, the malicious program is able to operate on the legitimate version and generate the correct checksum.

In the van Oorschot et al. attack, before execution of the checksum process has even begun, the attacker has already preconfigured the redirection/rerouting of instruction/data cache fetches (e.g., via manipulation of the hardware resolver), which is unaware to the legitimate process. For example, the legitimate program is unaware that it has been labeled as non-executable, and is also unaware that the error handler has been configured to cause another area of memory to be read when performing reads for the instruction/data caches. Although the redirection performed to load the malicious program into the instruction cache may take a significant amount of time, because the loading of the malicious program into the instruction cache occurred prior to the execution of the checksum process, which is the time from which the time measurement is taken (e.g., the timing of the checksum process does not begin until the software has begun execution and requests a seed), such an attack is difficult to detect by existing techniques, because the time taken to load the malicious program is not detected by the existing auditing techniques. Because the malicious code (loaded in the instruction cache) will perform the checksum (which the adversary has not modified, only the setup and/or the actions taken after performing the checksum) on the legitimate code, the correct checksum would be reported to the verifier.

In this example of the attack, the correct data pointer and program counter are used, where no offsets need be computed. For example, the program counter for fetching instructions is directed to the correct address of the legitimate program, and because it is the hardware resolver that performs redirection of the instruction fetch, the program counter is not modified. The instruction cache merely stores a copy of code to be executed (whether malicious or legitimate), and is unaware of where the code to be executed is coming from. The data pointer also need not be modified, as it points to the legitimate code, as it would if there were no malware. Thus, the data substitution attack of van Oorschot et al. also circumvents existing auditing techniques that compute the checksum as a function of the program counter and data pointer. In van Oorschot et al., the authors hypothesized that, other than self-modifying code, they did not believe that there was a way to overcome their attack. Described herein are techniques for countering data substitution attacks, including redirect-based attacks such as those described in van Oorschot et al. In some embodiments, the security of these techniques is based on the mechanisms by which hierarchical memory accesses work, and its computational efficiency may be comparable to that of the fastest versions previously proposed.

The example approach described herein uses no new hardware, and is not specific to any particular instruction set or device type. Although architectures using inclusive caching (i.e., where the contents of the L1 cache are duplicated in the L2 cache or other type of shared memory that is shared by the L1 instruction and data caches) are described herein for illustrative purposes, the techniques described herein can be variously adapted or modified for other cache architectures, such as exclusive cache architectures. In the examples below, systems with hierarchical caches are described, As described above, in the van Oorschot et al. attack, different versions of the auditing process (one legitimate and one malicious) have been placed in the instruction cache and the data cache.

In van Oorschot et al., several versions of their general attack, for a collection of common processor architectures, were described. The result of all of the versions is that read requests made for the L1 instruction cache and the L1 data cache—associated with the same virtual memory address—resolve to different physical addresses. This may sometimes be achieved by redirecting reads for the instruction cache. This may also sometimes be achieved by redirecting reads for the data cache. Independent of what adversarial approach is taken, it results in a data substitution attack that cannot be detected simply by monitoring the program counter and data pointer.

Understanding the Problem

In some embodiments, and as will be described herein, a data substitution attack is detected by forcing any memory redirects to cause "additional" cache misses. Existing remote attestation techniques do not include such a property. For example, the design referred to herein as the "Pioneer" solution is vulnerable to the attack of van Oorschot et al. The Pioneer solution corresponds to the techniques disclosed in A. Seshadri, M. Luk, E. Shi, A. Perrig, L. van Doorn, and P. Khosla, "Pioneer: Verifying Code Integrity and Enforcing Untampered Code Execution on Legacy Systems" in SOSP '05: Proceedings of the twentieth ACM symposium on Operating systems principles, Pages 1-16, New York, N.Y., USA, 2005. ACM Press (hereinafter referred to as "Pioneer").

Looking at why the "Pioneer" approach fails may be instructive: It involves a checksum process that fits, in its entirety, in the L1 cache; however, if an adversary loads the L1 data cache with a malicious version of the checksum process and then initiates the execution of it, then this redirection (by the exception handler from reading legitimate code to malicious code), very clearly, will not incur any run-time penalties. That is because the redirection that caused the malicious code to be loaded was performed before the execution (of the auditing) started. The verifier is unaware of any delay caused by the redirection because the checksum process does not signal that it is ready until it has already been loaded in the instruction cache and executed.

The example above shows that in order to detect the delays associated with malicious memory redirection, memory redirects should be forced to take place after the checksumming process has started (where the delays due to the memory redirects will affect the measured time elapsed during the verification session/process). In some embodiments, this corresponds to a checksum process that is substantially larger than the L1 cache, thereby causing frequent flushing of the L1 cache (i.e., if the L1 cache does not fit the entire program, then further instructions/data will need to be fetched from memory outside of the L1 cache and swapped with the existing contents of the L1 cache). Moreover, it should require that the adversary is unable to redirect reads from one L2 location to another, as the delay associated with this intra-L2 cache redirection would be limited to the diminutive delay associated with the operation of the exception handler. Very short delays may be difficult to detect due to the variance in communication times between the audited system and the external verifier, which will be described in further detail below. In some embodiments, for maximum detectability, the techniques described herein may be used to ascertain that the use of a memory redirection attack results in an L2 cache miss (causing the redirection to have to go out to even slower memory to perform the read)—but that the "legitimate" execution of the checksumming process or program does not.

FIG. 1 illustrates an example of an attempted data substitution attack based on redirection, where the checksum process fills the entire L2 cache and where the redirected read results in an L2 cache miss. As one example, on one typical PowerPC CPU, an L1 cache miss results in a 40 cycle penalty, whereas an L2 cache miss is associated with a penalty of at least 500 cycles; therefore, if approximately 4000 L2 cache misses were forced for a process running on a 3.4 GHz processor, a 0.5 ms delay would be incurred. The typical network latency variation for a LAN is typically half of that delay, making remote attestation over a LAN practical or feasible. In the example shown, the L2 cache 101 (shared by the L1 instruction and data caches) stores information 102 that when requested 104 from the L1 data cache 103 causes the information 102 to be copied 105 to the L1 data cache 103. However, in some embodiments, when L1 instruction cache 106 requests 107 the data 102, an exception occurs, causing a redirect 110 of the original read request 107 to a location 109 in slower memory 108, which may for example be L3 or Dynamic random-access memory (DRAM). As a result, as shown in this example, information 109 stored in slower memory 108 is copied 111 to L1 instruction cache 106.

Figure 2:
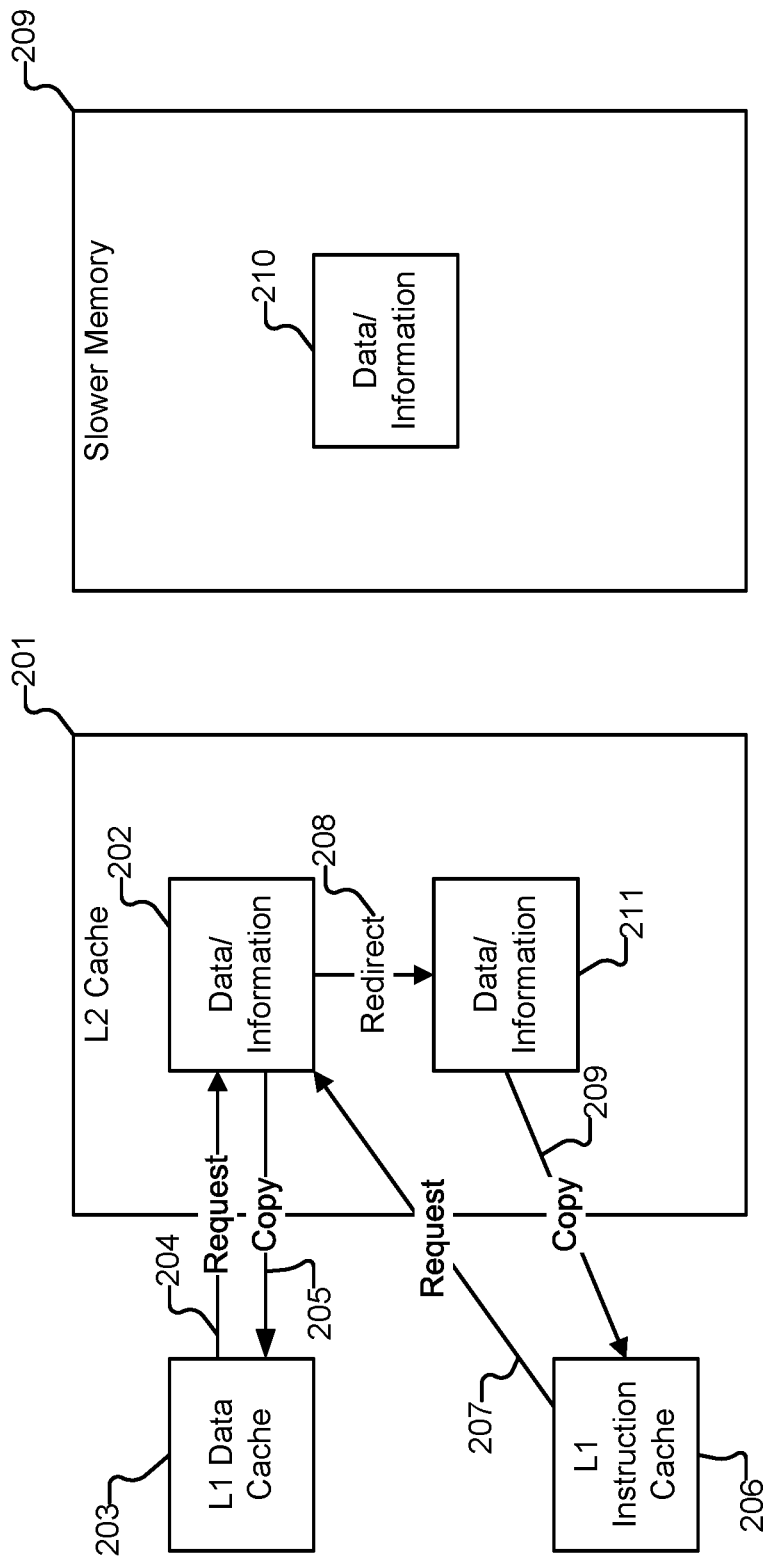
FIG. 2 illustrates an example embodiment of a redirect-based attack.

FIG. 2 illustrates an example of a redirect-based attack. An adversary may force redirects to be made from one L2 location to another, even if the checksum process takes up the entire L2 space. However, as shown in the example of FIG. 2, if the process is the size of the L2 cache, this necessitates the displacement of a portion of the checksum process from the L2 cache to slower memory (since the process has been implemented such that two entire copies of the process cannot fit into the L2 cache at the same time). When the displaced portion is requested, that results in a delay. Information 202 is stored in L2 cache 201, and is requested 204 for an L1 data cache 203, causing the information 202 to be copied 205 to the L1 data cache 203. However, a request 207 from L1 instruction cache 206 results in an exception, which causes a redirection 208 of the request 207 to information 211 stored in L2 cache 201, resulting in information 211 being copied 209 to L1 instruction cache 206. In this example, the data originally stored in the location used for information 211 is now instead stored in location 210 of slower memory 209, which may be an L3 cache or DRAM. As a result, a request for that information causes a request to location 210, which incurs a delay in comparison to a request that is resolved to the L2 cache 201.

Because the size of the checksum process is such that it fills the entire L2 shared cache, the malicious version of the checksum process and the legitimate version cannot both fit in their entirety in the L2 cache, and one of them (or at least a portion of one version) must instead be stored elsewhere (e.g., to slower memory). As another example, suppose that the legitimate version of the process is stored in the shared memory, and the modified version is stored in a slower memory. Thus, when the L1 instruction cache is flushed, that adversary cannot simply have instructions fetched from the L2 cache (which would be relatively fast), and instead, the hardware resolver would be forced to redirect instruction requests to slower memory, resulting in a larger delay for each L2 cache miss. In the case of the legitimate process, with no malware, the L2 shared memory could be read, without any L2 cache misses. As the checksum process is configured to also be much larger than the L1 cache, large amounts of swapping will need to be performed resulting in a large amount of churn. In the presence of malware, this will in turn result in a large number of delays (due to redirection and induced L2 cache misses) that will accumulate to a point that the aggregate delay is detectable by the verifier. By having the checksum code fill up the entire L2 cache, at least one of the legitimate process and a malicious version (or at least a portion of one of the versions) would have to be stored or otherwise displaced outside of the L2 cache, causing L2 cache misses. For example, if the malicious process were in the L2 cache, then there would be delays during reads for the data cache (because the legitimate code would not also fit in the L2 cache and would be in slower memory). If the legitimate process were in the L2 cache, then reads would occur quickly, but L2 cache misses would be incurred when performing instruction reads for the instruction cache. Thus, the adversary would be forced to perform expensive L2 cache misses when performing redirection. In some embodiments, rather than filling up the entire L2 cache, the size of the checksum program is at least greater than half of the shared memory so that not all of both of the malicious version or copy of the legitimate code can fit in the L2 cache.

Amplifying the Adversary's Penalty

In some embodiments, to amplify the delay associated with redirection attacks, it is beneficial to maximize the number of expensive cache misses suffered by a malicious process. This can be achieved in various ways:

1. Reduce locality of reference. In some embodiments, it is beneficial for the checksumming process not to exhibit strong locality of reference—whether for instruction or data reads. The result of low locality of reference is an increased number of L2 cache misses incurred by a malicious process that uses redirection. As a special case of this goal, it may be desirable that the L1 instruction cache is automatically flushed for each iteration of the checksum process.

For example, if the checksum process has a high locality of reference (e.g., where the process is read sequentially or linearly), then cache lines may be reused over multiple reads, reducing the number of L1 cache flushes and L2 cache misses. Thus, locality of reference should be reduced as much as possible to maximize L2 cache misses (which will occur because the checksum process/program has been written to fill the entire shared cache, as described above). This will incur the maximum number of delays possible (e.g., on every read), resulting in the largest time differences/delays possible.

In some embodiments, this absence of locality of reference is an intrinsic property or characteristic attribute of the process, as opposed simply to how it is implemented. Otherwise, an adversary may be able to create a malicious process with better runtime behavior than the legitimate process.

2. Understand cache prediction. Cache predictors may affect the execution time of processes—whether malicious or not. Whereas successful cache prediction may appear to be an issue in the context of remote attestation, this may not necessarily be the case. For example, successful L2 cache prediction may be undesirable as it makes detection harder by speeding up the execution of a malicious process. Successful prediction of L1 misses, on the other hand, may not be harmful—and may in fact be beneficial, as it reduces the computational time for the legitimate checksum process. Further details regarding cache prediction are described below.

Figure 3:
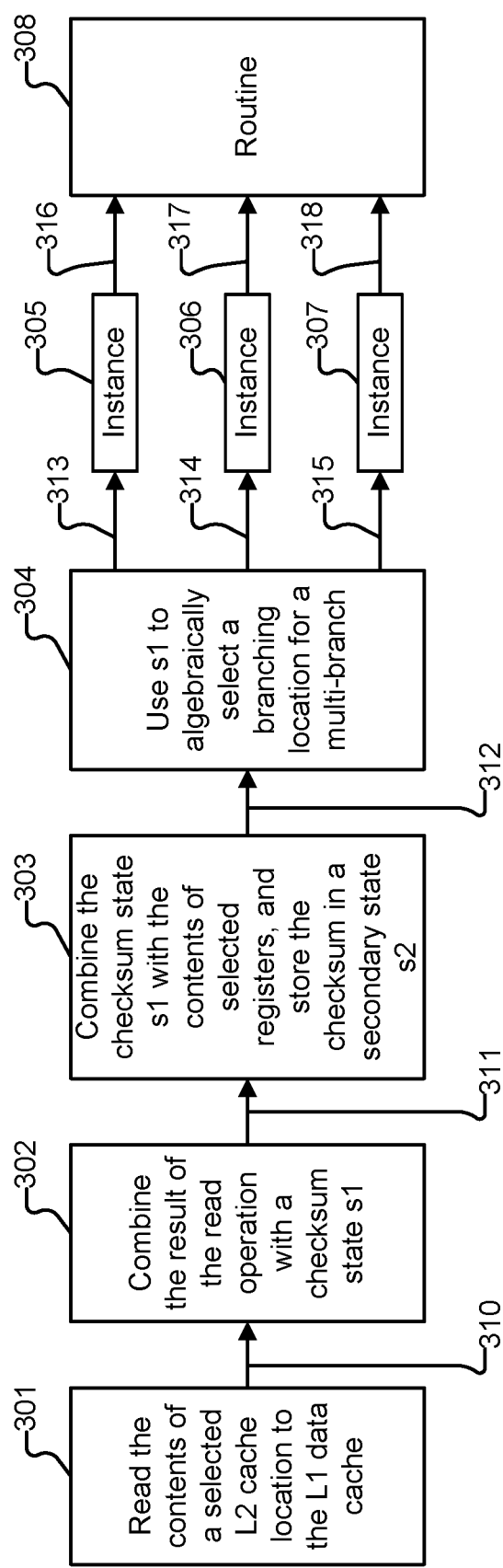
FIG. 3 illustrates an example embodiment of a checksum process.

FIG. 3 illustrates an example embodiment of a checksum process. As shown in this example, the checksum process may be broken down into segments of code used to read input values, compute a checksum, force cache misses, and amplify the penalties associated with cache misses. Referring to the steps shown in the example of FIG. 3, an example checksum process is described as follows:

1. The contents of a selected L2 cache location are read to the L1 data cache. This corresponds to step 301.

2. The result of the read operation is combined with a checksum state s1. This corresponds to step 302. For example, if the value X corresponds to what was read by the read operation, then combining X and the checksum state s1 may be performed as a function of both of these values, such as X XOR s1, or (X+s1)*2, or other combinations that cause a result that depends on both the value of X and the value of s1. Further example combination operations are provided below, and may be replaced with yet other combination functions as well.

3. The checksum state s1 is combined with the contents of selected registers, and stored in a secondary state s2. This corresponds to step 303. As will be described below, the contents of the selected registers are modified during each iteration of the checksum process by procedure instances or accumulator portions/routines. In this step, the contents of the selected registers are integrated with the checksum. For example, in a first iteration, suppose that the checksum is initialized to an initial value (e.g., 0) as part of a setup process (described in further detail below). The values of selected registers have also been initialized as part of the setup. The selected register values are combined and integrated with the checksum. For example, the contents of the selected registers may be XORed with the checksum. This new value may be stored as a new checksum. Over the course of the checksum process, the state of the selected processors will be modified and integrated with the checksum to determine how the checksum process flows, which will be described in further detail below. In one embodiment, the secondary state s2 is kept in the same register that the checksum state s1 was stored in, and corresponds to a modification of the original value s1, in which register values such as those described below are combined with s1 to obtain s2. In one embodiment, the combination function is a function that combines the entropy of all inputs, i.e., both s1 and the registers to be combined. One example combination is s1 XOR R1+R2, where R1 and R2 are two example registers. Additional registers can be combined, and different combination functions may be used. In one embodiment, the combination functions are not commutative, whether internally or in between two consecutive applications, such that the order of the operations affects the finals result. In another embodiment, s1 is stored in a first register and s2 is stored in another register, which may then be further modified before the value is written back to s1 and the next iteration of the loop begins.

4. In step 304, the checksum state s1 is used to algebraically select a branching location for a multi-branch with a large number of different procedure locations (locations of procedure instances or accumulator portions/procedures), where three possible branches correspond to transitions 313, 314 and 315 in this example. In one embodiment, this value s1 is that which has been at least in part modified by combining it with a value that was read, one or more registers, or a combination of (or function of) these. For example, a set of operations is performed on the checksum state s1 to determine what location to branch to.

In this example, a register j is used to store the location to jump to at the end of the procedure. In some embodiments, the location j is independent of the selected procedure and corresponds to a jump to routine 308. One example of routine 308 is an iteration control routine, which determines whether another iteration of the checksum process is to be performed. Further details regarding iteration control are described below.

In this example, step three, corresponding to 303, takes the same or similar amount of time as an L1 cache miss incurs. This leads to an efficient execution with no delay after the execution of the multi-branch instruction—unless an attacker is performing, for example, a redirect-based attack as shown in the examples of FIGS. 1 and 2.

5. In this example, in each procedure instance 305, 306 and 307, the state s2 is modified in a different way and the result of the operation is stored in the register for state s1. Thus, in this example s2 may be seen as a temporary variable that holds a partially modified version of the original state s1. The same computational result may also be obtained using only one register. By using both s1 and s2, the operation on s1 from which s2 results may be independent on the branching due to the state value, whereas the modifications applied to s2 depend on the branch that is taken. The same result may be achieved using only one storage area, such as one register. In the example shown, the procedure ends by jumping to the location j, set in step 4 (304). These are jumps 316, 317 and 318. Thus, the selection of the jump location depends on the value j, which is determined by a previous state, as described above. In this example, this corresponds to starting the execution of the next code segment 308.

In some embodiments, the execution flow in 310, 311 and 312 may be due to the regular updating of the program counter, or the result of a jump instruction.

The example code of steps 1-4 (301-304) described above is referred to herein as the "control portion" (as this part controls the execution flow), and the code of step 5 (procedure instances/accumulator procedures 305-307) is referred to herein as the "accumulation portion" (where the manipulation of the register contents implements a non-linear accumulator). In this example, the non-linear accumulator corresponds to the collection of all branch segments, each one of which modifies the state s2 or generates changes to one or more registers based on s2.

In some embodiments, prior to step 301, setup is performed, which may include contacting an external verifier and receiving initial state information, such as a seed, hop length, initialized values for registers (e.g., the selected registers of step 3, 303), etc. Further details regarding setup are described below. In some embodiments, steps 301 and 302 are combined together as a single step/component. As described above, one example of the routine 308 (to which a jump is made at the end of the accumulator procedure) is iteration control code, which determines whether another iteration of the checksumming is to be performed. In some embodiments, if there are no iterations to be performed, then concluding code is executed, where, for example, the results of the checksum are reported to the external verifier. A payload may also be received and a routine performed. Further details regarding concluding code are described below.

Figure 4:
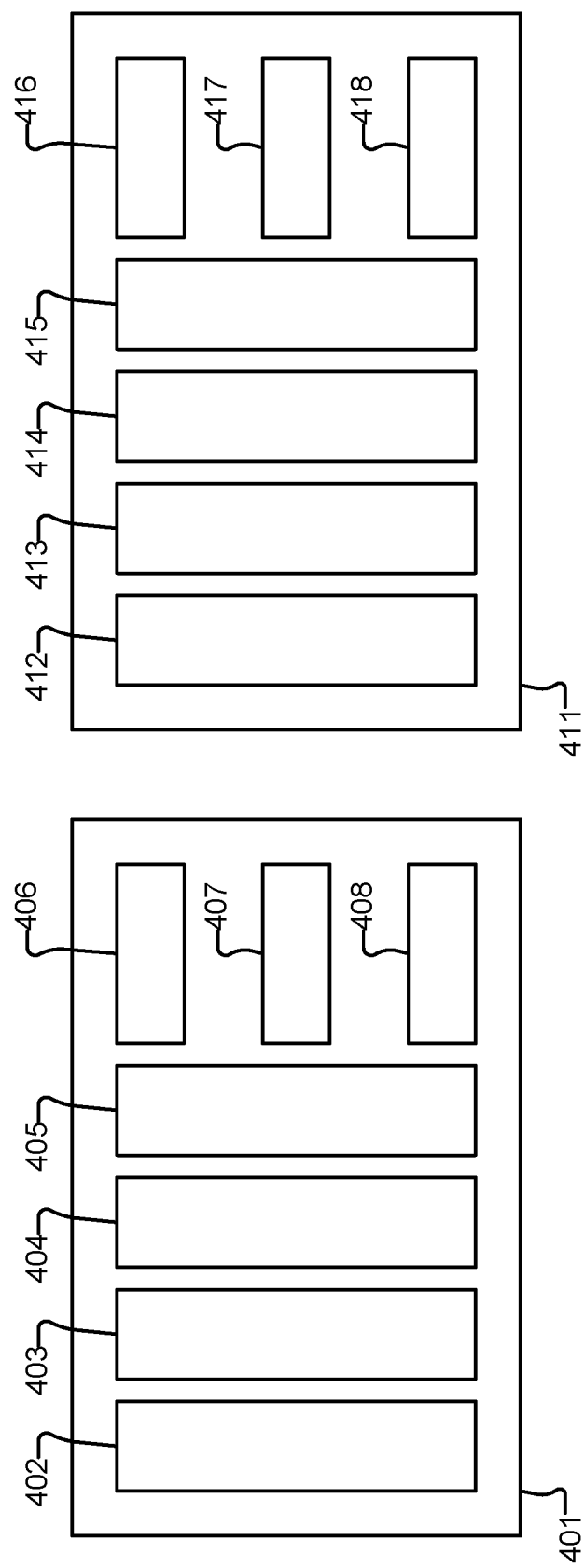
FIG. 4 illustrates an example embodiment of a daisy-chained sequence of code segments.

FIG. 4 illustrates an example embodiment of a daisy-chained sequence of code segments. In some embodiments, a sequence of code segments, as described above, is daisy chained to form a circular structure, a portion of which is shown in the example of FIG. 4. In this example, different segments of the chain use control portions with different code from each other, while the elements corresponding to the accumulator are reused, for example, in the form of a very large common table of candidate (accumulator) procedures or operations. In some embodiments, at the "end" of the daisy chain, it is determined (e.g., by iteration control code) whether to start a new iteration based on whether the input string has been checksummed. Here, in this example, the input string corresponds to the series of read operations to be performed in the process of executing the enter checksumming process. If this has not completed, a new iteration is performed. In one embodiment, it is determined whether the entire checksumming has completed by increasing a counter that was instantiated (e.g., to 0) at the beginning of the execution, and compare the resulting incremented counter value to a value that corresponds to the number of read operations to perform to read the entire input string. In this example, the input string corresponds to the process to be executed, as this process checksums itself. In some embodiments, sequences 401 and 411 correspond to two different instances of the sequence corresponding to steps 302, 303, 304, 305, 306, 307 and 308. In the example shown, step 402 corresponds to step 412, step 403 to step 413, step 404 to step 414, step 405 to step 415, step 406 to step 416, step 407 to step 417 and step 408 to 418. In some embodiments, step 412 corresponds to step 308. In some embodiments, a series of n code segments such as 401 and 411 are daisy chained and connected in a loop using a segment in which iteration control is performed. In some embodiments, sequence 401 corresponds to sequence 411, but in some embodiments is not identical. While branch targets 406, 407 and 408 may correspond to branch targets 416, 417 and 418, the code contents of the sequence 402, 403, 404, in some embodiments, are not the same as the contents of the sequence 412, 413, and 414. In some embodiments, the function implemented by 401 is non-commutative with the function implemented by 411.

In some embodiments, the amount of memory required to store the instructions executed for one full rotation of the daisy chain is configured to exceed the size of the L1 cache, thereby automatically forcing the L1 instruction cache to be continually flushed.

As one example, the instruction cache may fit the code to perform integration of register modifications/read data to the checksum, branch decision code, one of the procedure instances/accumulator portions, and the iteration control code. When a next iteration is performed, some portion of the cache will need to be swapped out. For example, a new operation/procedure instance may be selected for an iteration, where the new accumulator procedure is not already in the L1 cache. This will cause the L1 instruction cache to be flushed. Thus, for example, if the instruction cache fits 5% of the selectable accumulator portions, then with 95 percent probability, a read out to the shared memory will need to be performed. Using the techniques described herein, the likelihood that flushing of the instruction cache is performed when a branch occurs is maximized (i.e., the adversary will load an instruction, have it fail, and then be forced to perform a redirect, incurring a delay).

In some embodiments, the L2 memory space is partitioned into sections of contiguous bits. Each memory section contains code corresponding to setup, a control portion, an accumulator portion, iteration control, or concluding code. In some embodiments, the setup code turns off interrupts, receives a seed and initializes all registers. The control portion updates the checksum state—where each control portion instance may perform this in a slightly different way. It then uses the state to select an accumulator portion to which it branches. Each accumulator portion, of which there may be a very large number, modifies the checksum state in a distinct manner. As there are a large number of accumulator portions that may be selected, and the address for what accumulator portion to select cannot be determined until a computation is made using modified state, an adversary cannot predict ahead of time what accumulator procedure will be executed during a loop.

Performing branches/jumps to accumulator procedures depending on checksum state disrupts the functionality of pipeline predictors, which will further penalize a malicious adversary.

The execution of an instruction may take numerous processor cycles. For example, for an instruction to be executed, the instruction is loaded, interpreted, etc. over a number of processor cycles. Arguments may also need to be waited on before an operation can be performed before a result is stored. While waiting for the arguments, there may be several clock cycles where no actions are being performed.

A pipeline or branch predictor may be used to optimize the use of clock cycles. For example, while the argument for a first instruction is being loaded, an action may be performed for a next instruction to be executed. For programs that have jump or branch conditions, the pipeline predictor may be used to predict what the next instruction to be executed is.

If the pipeline predictor performs an incorrect prediction, loading an instruction that was not actually the one to be executed next, then what was loaded is scrapped, and another instruction is loaded. I.e., the prediction was incorrect, and the pipeline was disrupted. It would be beneficial to disrupt pipeline prediction such that the adversary is unable to anticipate what instructions are to be loaded next. For example, the redirection by the hardware resolver may take a certain delay (e.g., 10 ms). If the malware were able to predict or anticipate the next instruction to be loaded more than 10 ms prior, then the adversary would be able to neutralize the delay.

In this example, as the checksum state is updated/computed every loop (e.g., by integrating the checksum state with modifications to the contents of selected registers), and the decision of what accumulator procedure to execute is dependent on the checksum state, what accumulator procedures will be performed and in what order is randomized, making it difficult to predict the sequence and order of the procedure instances that will be executed when performing the checksum process. I.e., the cell for the next instruction to be executed during the checksum process cannot be determined until the register state modification is computed (until the jump address is computed, it cannot be determined what cell to be loaded). This causes the pipeline predictor to work poorly. Thus, multiple instructions cannot be worked on at the same time.

Thus, similar to the way that caching has been disrupted, pipelining is also controlled and disrupted such that the adversary cannot predict what accumulator procedures will be executed and in what order, and therefore cannot take preemptive measures to reduce any delays due to the redirection to circumvent detection. Further, as the size of the caching program is such that L2 cache misses will be incurred, on each iteration, the adversary will be forced to reach out to a slower memory, and unable to take advantage of the pipeline predictor to preemptively load the next instructions.

In some embodiments, the iteration control is used to determine when the checksumming has completed. For example, the iteration control determines whether the number of loops/iterations to be performed has been reached. If there are still more iterations to perform, then the process returns, for example, to step 1 (301) of FIG. 3. In some embodiments, iteration control code is an example of the code 308 that is jumped to after an accumulator procedure is executed.

If the computation of the checksum is complete, then concluding code is executed. As one example, the concluding code transmits or reports the checksum result to an external verifier. The verifier then verifies the reported checksum result. For example, the verifier also has a copy of the checksum program stored and knows the initial state (e.g., seed, hop length, etc.) that it sent to the audited device, and therefore calculates exactly the same checksum.

After the checksum has been approved by the external verifier, a routine to be run is loaded. In some embodiments, the validity of the loaded code is checked using a hash function, where the result is compared to the expected result, stored as part of the checksum process. If there is hardware support for a hash function, then the hardware may be used to determine the validity of the loaded code, but note that this code may otherwise be part of the concluding code.

As another example, if the checksum is verified (e.g., the verifier confirms that the correct checksum value was computed in the correct amount of time), then the audited device receives a payload from the verifier, such as a decryption key. The auditing program then performs its designated task, such as accessing a resource using the received key (e.g., by performing decryption using the key). In some embodiments, the audited device also reports to the verifier that it has performed the programmed task or routine executed after verification.

Determining the length of the daisy chain.

Figure 5:
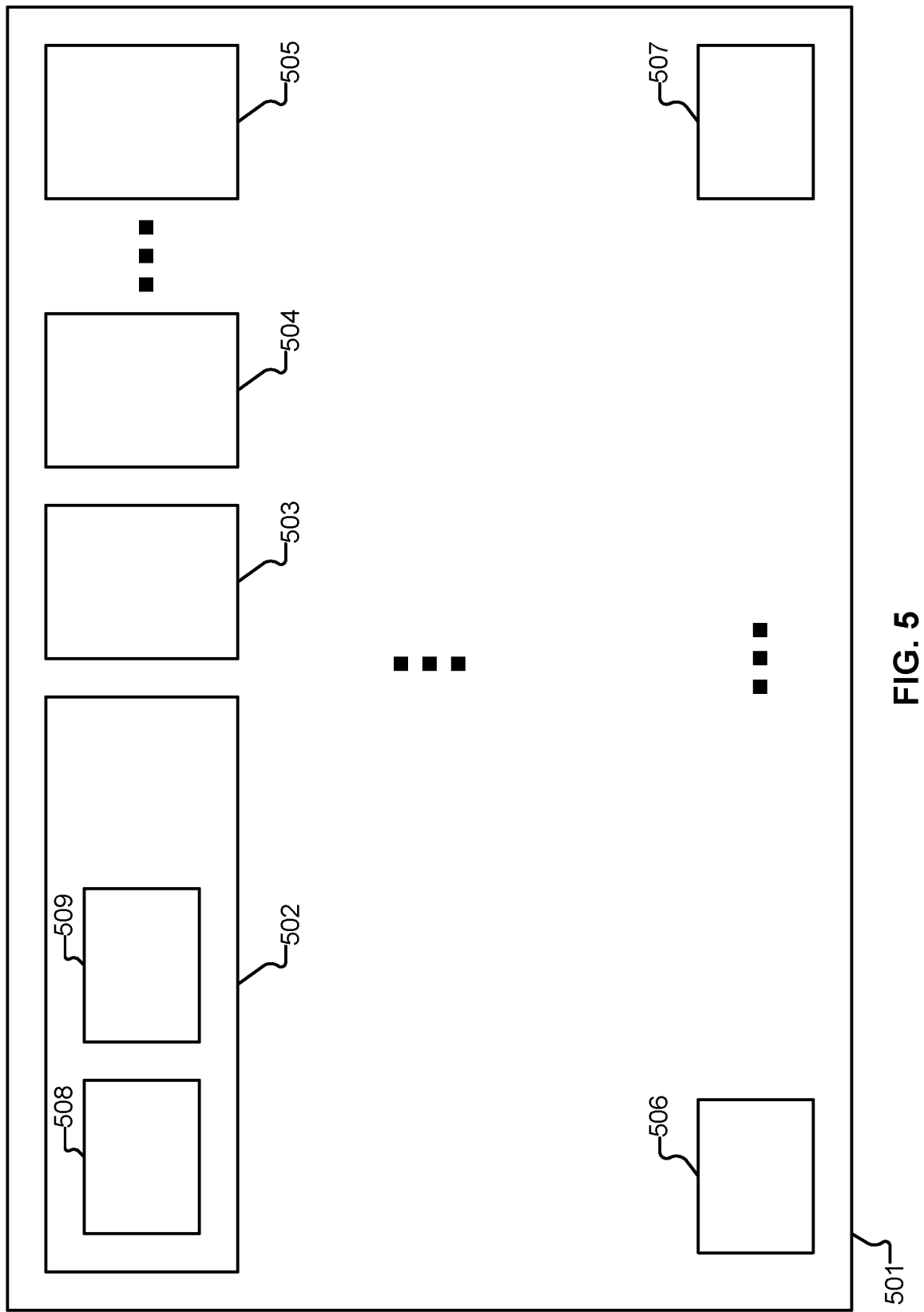
FIG. 5 illustrates an example embodiment of checksum code.

FIG. 5 illustrates an example embodiment of checksum code. As shown in the example of FIG. 5, the L2 memory space is divided into N code sections, each one of which has size S(section). Here, in this example, N=S(L2)/S(section), where S(L2) is the size of the L2 cache. Denoting the size of the L1 cache by S(L1), the number of code sections that fit in the L1 cache, in this example, is n=S(L1)/S(section). In some embodiments, to guarantee that the L1 instruction cache is flushed for each iteration of the checksum process, each iteration is configured to execute at least n sections. This can be guaranteed by setting the number of daisy chained code elements to n. A daisy chain of length n/2 should be sufficient, since the execution of each control code section results in the execution of one accumulator code section; however, due to the relatively large similarity between the control code sections (whose execution order may be fully predictable), in some embodiments, a conservative parameter selection adds a buffer.

In the example of FIG. 5, checksum code 501 is of the same size as the L2 cache, and includes sections 508, 509, 503, 504, 505, 506, and 507. In this example, the entire space corresponding to 501 comprises N sections. In some embodiments, sections 503, 504, 505, 506, and 507 contain code corresponding to procedures such as 305, 306 and 307. Sections 508 and 509 contain code corresponding to non-procedure code. In some embodiments, this code takes up space 502.

Example Scenario

Consider the following configuration, in which each section corresponds to 16 words, each word 32 bits long. Thus, S(section)=16×4=64, where the size is measured in bytes.

In some embodiments, a typical mobile device has a 1 MiB L2 cache, and one or more processors with a 4 KiB L1 instruction cache and a 4 KiB L1 data cache. Therefore, in this example, S(L2)=220 and S(L1)=4096. Thus, this results in N=S(L2)/S(section)=16384 and n=S(L1)/S(section)=64.

Continuing with the example, consider 502 of FIG. 5. In this example, this code does not correspond to accumulator code. In some embodiments, the accumulator code corresponds to sections 503, 504, 505, 506, and 507. Suppose, for example, that code 502 requires space corresponding to one hundred and five sections. This leaves space corresponding to 16384−105=16279 sections for the accumulator code, which, in some embodiments, corresponds to accumulator procedures such as accumulator procedures 706 and 707 of FIG. 7 (described in further detail below). In each control section, state s1—which, in this example, is a 32 bit number—is converted to a branching location. In this example, a tentative branch location is computed as (s1 AND FFFFFFF0), effectively generating one of the 16384 section addresses. It is then determined whether the result is less than 105×16×4=6720, which corresponds to a location outside the procedure space; if so, then (any) one of the 28 most significant bits of the tentative branch location is set to 1, thereby remapping the location into the range of procedure addresses.

An evaluation of locality of reference: In some embodiments, the process described herein exhibits a limited locality of reference for execution, beyond the execution of instructions within one code section. Therefore, if the adversary has instrumented the system to trigger an exception when code corresponding to one or more pages is accessed, then each cache line read within such pages will trigger the exception.

In some embodiments, to achieve a similar absence of locality of reference for the data accesses, linear reads of the L2 cache are avoided. This may be achieved if the distance between two consecutive data reads is d (where the distance is also referred to herein as a step or hop length) before the location is reduced modulo the size of the L2 cache, where d is an odd number such that $|d| \times n < S(L2)$ and $|d| > S(page)$. Here, S(page) denotes the size of a page. In some embodiments, since d is odd, the same location will not be read twice until all locations have been read, at which point the checksum function concludes.

In some embodiments, the value of the parameter d (hop length) is drawn uniformly at random by the external verifier and communicated to the audited system as part of the seed value. In some embodiments, if the audited system has multiple processors, one value d is selected (e.g., uniformly at random) for each processor. Further details regarding auditing of multi-processor systems will be described below. Returning to the example above, where an assumption is made that S(page)=4096, this would mean that d would be selected in the range 4096<<258.

Function properties: Step 3 (303) of the example of FIG. 3 described above combines the content of a collection of registers with the state register s1. For example, during the setup, the contents of the collection of registers may be initialized, for example, using values received from the verifier. The contents of the registers are integrated with the state register s1 (checksum state). In some embodiments, these registers are modified in the accumulator procedures (e.g., of step 5 of FIG. 3). At each iteration of the checksum, the contents of the modified registers are integrated with the state register s1 (e.g., using the registers modified in the previous iteration). In some embodiments, all registers used in the various branches are combined with the state s1. As one example, the integration is performed by XORing the content of the collection of registers with the checksum state. As another example, the integration is performed using ANDing. As another example, the integration is performed by performing a series of arithmetic and logical operations, such as XORing the state with a first register, adding the contents of a second register, then ORing the result with a third register and XORing the result of that operation with a fourth register. A large set of integration functions may be used. In some embodiments, data read into the L1 data cache is also combined with the checksum state and the contents of the selected registers. As described above in step 4 (304) of FIG. 3, the checksum state s1 after integration with the content of the collection of registers is used to select a branching location (e.g., address) for a multi-branch with a large number of accumulator procedure instances.

The procedure instances may perform various different operations. For example, in one procedure instance, the existing contents of register r5 may be XORed with the state s2; in a second example procedure instance, the contents of register r6 are rotated two bits to the right; while in a third example instance, the contents of r5 and r6 are added to each other and stored in register r3; and in a fourth example instance, the contents of the processor flags are XORed with the contents of the register keeping state s1 (where the value of the register keeping state s1 is changed, or a resulting state s2 is produced). Additional examples involve adding, subtracting, multiplying, dividing, shifting, and rotating the contents of state holding registers, whether, for example, with constant operands or using other register contents as operands.

As yet another example, one procedure instance may take a register and add "1" to the value in the register. Another accumulator procedure may XOR one register with another register, whereas a different operation will AND registers together, while yet another procedure instance would take a register and set its value to "55." As described above, certain registers are selected to be modified. Some registers are not directly modified by the accumulator operations. Some registers, such as the register used to store the number of loops/iterations that remain to run are not modified by the routines/operations (as this may cause the program to crash).

In some embodiments, the operations (procedure instances) are selected such that the operations combine the contents of state registers in a manner that is not commutative when considering a sequence of operations. Here, in this example, the state registers correspond to one or more registers such as s1 and s2 whose contents are modified as a result of the checksumming, and which affect the branching location corresponding to the value j. In some embodiments, each procedure instance includes a different set of such operations, modifying the contents of the registers. In some embodiments, the operations are selected such that the effect of most pairs of accumulator procedures is non-commutative (i.e., the order in which the procedures are invoked matters). Consequently, in some embodiments, the checksum function implements a non-linear accumulator.

By making pairs of accumulator procedures non-commutative, this further enforces that the ordering of the operations performed during checksum processing matters, further preventing the adversary from predicting the sequence of operations to be executed during the checksum process or pre-emptively performing computations in order to reduce runtime execution delays. This causes the computation of the checksum to be made unpredictable to an attacker.

Thus, as described above, the different operations, which may be numerous, will combine or "mush" together the content of selected registers. In some embodiments, the different operations/accumulator procedures are configured in such a way that they take a similar or same amount of time to execute. The different operations may also be different code segments that have the similar or same code length (i.e., all the procedures perform different operations, but the amount of code used to represent the procedures is the same). For example, suppose that the routines/segments are all of length L. A first routine is at address A. The $i^{th}$ routine is to be selected. Then the address for the $i^{th}$ routine may be computed as A+i*L. The jump/branch address may be computed to generate an address that adheres to the aforementioned format such that there will not be a jump into the middle of a routine.

In some embodiments, the lengths of the operations/routines are a power of two, so that logical operations may be used to transform the checksum state into a jumpable address, simplifying the computation of a jump address when determining a branch location.

The different operations/functions are written to perform different tasks, without similar aspects. If the operations perform the same or similar operations, an attacker may take advantage of the similarity to perform compression to take up less space, etc. in order to circumvent detection.

Setup Code:

In some embodiments, the setup code turns off interrupts; receives initialization values for the registers used and for the "stepping" or hop length variable d; and sets the counters used for the iteration control (e.g., number of loops).

As another example, the register storing the checksum state is initialized (e.g., to zero), which will be updated as the checksum iterations progress. As described above, various values for other registers (e.g., used in determining branch locations, that are modified by the accumulator procedures, etc.) may also be initialized.

In some embodiments, all registers used by a processor are utilized in the checksum process. This is to prevent an attacker from using a free register as a resource to their advantage. Thus, those registers not used for control of the program may be used, for example, when updating the checksum value.

Concluding Code:

In some embodiments, the concluding code transmits the final checksum value to the external verifier; awaits a response; then loads and verifies the correctness of the process to be run in a safe state. In some example instances, the response contains a key (to be used to decrypt a resource); in other cases, it contains the result of an operation that the audited device wishes to initiate.

The process described herein can be applied to both single-core and multi-core processors. In some embodiments, multi-core implementations may cause bus contention every time two or more cores make simultaneous accesses to data in the L3 cache or DRAM. This amplifies the delay associated with attempting a data substitution attack. This type of contention may take place—even for the legitimate checksum process—on systems with shared L2 caches. In some embodiments, legitimate L2 contention is taken into consideration when determining what the expected computational time is.

One example way to warm the L2 cache is to run the checksum process twice in a row—receiving different seed values for each time—and ignoring the checksum value from the first computation.

Provided below is a security argument or assessment that is not specific to a particular instruction set, nor to the performance of the hardware or the size of the caches. Thus, the security argument is based on the structure of the building blocks and their effects on the memory management, as opposed, for example, to the specific sequence of instructions in an implementation. The provided security argument is broken into a collection of separate arguments, covering the principles that, when combined, result in the security of the rapid verification approach described herein.

The computation cannot start early. In some embodiments, the computation of the checksum function depends on the initialization values received during the setup phase. These may have a sufficient entropy that it is not feasible to precompute a non-negligible portion of the potential (seed, checksum) pairs a priori.

Moreover, in some embodiments, the operations of the accumulator components of the checksum function are non-commutative, by virtue of including computational elements that by themselves are non-commutative (such as a combination using XOR and bitwise shifting). Therefore, it may be impossible or challenging to pre-compute any portion of the function ahead of receiving the initialization values.

The absence of efficient compression: In some embodiments, the checksum process includes code sections with substantial individual variations. This protects against the creation of a more compact process. For example, if the code for a large number of different control segments was identical to each other, they could, for example, be "rolled" (e.g., opposite of unrolled) with a rather small computational penalty. Similarly, if the individual accumulator procedures all belong to the same family of functions, this may lead to more compact representations of the code. For example, if the ith procedure were to perform the function of adding the number i to the input, then this allows for a notable code size reduction without an associated ballooning of the computational costs. While computationally expensive compression techniques may potentially be used to reduce the effective size of the code to some extent, there may be a substantial run-time cost associated with such techniques. Therefore, in some embodiments, the code cannot be modified in a manner that both reduces its size and maintains its approximate execution time. In particular, it may be implausible that there exists a more compact representation of the checksum process that is at least one memory page smaller than the original version, and where the modified checksum process has a comparable execution time to the original.

The guarantee of delays: In some embodiments, the checksum process is configured to fill the L2 cache. Since redirection attacks may operate on the granularity of pages, an attacker would have to cause an L2 cache miss for at least one page (as shown in the examples of FIGS. 7-10) as a result of performing a redirection-based data substitution attack.

Similarly, performing a data substitution attack that does not rely on redirections may necessitate L2 cache misses, since to use one process to checksum another process, both of these processes would need to be stored and accessed.

The amplification of delays: An example goal of the construction described herein is not only to make delays an inevitable result of any data substitution attack, but also to maximize these delays. Recall that the delay is incurred, for example, when information residing neither in the L1 nor L2 cache is requested. Thus, delays may be maximally amplified if two reads to the same location always result in two L1 cache misses. In some embodiments, this is achieved by the automated flushing of the L1 instruction cache, using a daisy chain whose cycle is long enough that one iteration of the daisy chained code will cause the instructions "one iteration away" to already have been flushed.

Data reads are now considered. In some embodiments, d (also referred to herein as a step or hop length) is a random odd number such that $|d| \times n < S(L2)$ and $|d| > S(page)$, where $S(page)$ denotes the size of a page. Thus, in some embodiments, the same page will not be accessed for any n consecutive data accesses, since the distance between two accesses at a distance $i < n$ is greater than $i \times S(page)$ but smaller than $|d| \times i \leq |d| \times n < S(L2)$.

Thus, L1 caches will be automatically flushed between two accesses to the same cache line, whether considering the instruction or data cache, which, in turn, in some embodiments, results in the maximum L2 cache miss penalty, should any data substitution attack take place.

The checksum that is computed depends on memory that is read as data—in this case, the checksum operates on the program itself, where the data that is read is the program itself. The data that is read (and placed in the data cache) is also stored in a register. As described above, various operations may be used that will change the way in which read memory will be modified when computing the checksum.

The checksum program performs iteratively such that all of the memory is read as data/input values to the checksum, so that the checksum is influenced by all of the checksum program. In some embodiments, the program is read as data (versus code to be executed) in a manner that reduces cache line reuse. For example, suppose that a cache line is 128 bytes. If two data reads are in the same cache line, then this may provide the adversary an advantage because the cache was reused. Instead, the attacker is forced to reuse as little of the cache as possible. In some embodiments, the data that is read is determined according to a hop length (parameter d described above), which determines a step in the data read addresses. In some embodiments, the hop length is outside of the length of a cache line, and is also an a priori unknown value. By making the hop length a priori unknown, an attacker is unable to predict what the step in data reads will be. As one example, the hop length is provided by the verifier (e.g., along with the seed value), such that the audited system does not know what the hop length will be. The hop length is used to determine what portion of memory is to be read next as data to be inputted to the checksum.

Suppose, for example, that the hop length transmitted to the audited system is 129 bytes. This length is longer than a cache line of 128 bytes. Thus, two reads in the cache line will not occur. After 128 loops/iterations of the checksum, all of the program will have been read of data. Modular arithmetic may be used in the event of wraparound addresses. By introducing a hop length, and combined with a known number of times to perform data reads (which will be stored in the data cache), checksumming of the entire program as data is ensured. Because the hop length is not known a priori (e.g., the hop length is not hardwired into the checksumming program), the attacker is denied being able to take advantage of knowing the hop length ahead of time.

As the checksum program is written to be larger than the data cache, the jumping according to the hop length will also cause flushing of the data cache.

In some embodiments, the memory layout of the code cannot be optimized. For example, an attacker wishing to speed up the computation by remapping memory before the start of the checksum process will not be successful. Considering instruction accesses first, the access pattern for the procedure calls is not a priori predictable to an adversary, since it depends directly on the initialization values received from the external verifier. Moreover, the adversary cannot change the L2 memory mapping in the context of data access without also changing it for instruction access, and vice versa. Therefore, at most, the adversary can change the ordering of the sections (which are units of S(section) bytes); doing so, however, will incur the tremendous computational cost of performing a reverse mapping for each multi-branch instruction.

There may be a minimum amount of memory that can be labeled as non-executable. For example, there may be a minimum segment/section size of the checksum process that may be labeled as non-executable. An adversary may label only portions of the checksum process as non-executable, such as those portions that control interrupts or access (after the checksum process). Suppose that the memory of the checksum process is laid out such that the interrupt control and payload access (which may only occur infrequently and at the beginning and the end of the code) take up their own segments that do not include any of the checksum operations that are iterated over, then the adversary would be able to label only those segments as non-executable (rather than the checksum computation portion of the code), and thus only a small number of redirections and L2 cache misses would occur, resulting in a small number of delays that may be difficult to detect.

In one embodiment, the code is laid out such that setup and the final payload (e.g., decryption key, access to a resource, etc.) make up only a very slim portion of the code, such that all segments into which the checksum process could be divided would include large amounts of checksum operations, which would be iterated over numerous times. As another example, the setup/payload of the code is distributed throughout the code. Thus, even if the adversary only labels a subset of the segments of the code as non-executable (such as those segments that include some amount of setup/payload), because all segments would include mostly checksum operations that would be executed iteratively, a large number of redirects would still be forced. For example, even if the adversary picks only the segment (e.g., 64 KB block) that includes the setup to be labeled as non-executable, because the setup is designed to only take a small portion of the block, the remaining portion of the segment will include portions of the main loop of the checksum process that will be executed iteratively. Thus, even though the setup may occur only once, the block/segment would still be repeatedly requested during the checksum process. Thus, every time that the block is accessed during the checksum process loop, redirection will occur. By laying out the code in the manner described above, no matter what modifications that the adversary makes, they will not be isolated in its own segment, free of other code, but included in a segment that includes main loop code that will be iterated over repeatedly, resulting in many redirects (and therefore generate a large delay).

Thus, the memory layout of the code is such that no segments of the code include only setup or payload code (i.e., every block/segment includes main loop code). Regardless of the modifications made by the adversary, any block(s) that the adversary will label as non-executable will include checksum main loop that will be requested repeatedly over the course of the checksum process, causing numerous redirects and L2 cache misses.

The guaranteed detection of attacks: Based on the above analysis, it is concluded that a data substitution attack must at least cause a total of S(page) misses at the L2 cache. Assuming that this corresponds to a longer time than that associated with the communication latency variance for one roundtrip between the external verifier and the audited system, a data substitution attack would then be detected. If this assumption does not hold, however, the approach of iterating the checksum process multiple consecutive rounds, in some embodiments, results in the necessary delay above the detection threshold. Thus, in some embodiments, security is based on configuration in terms of the number of iterations, and may depend directly on the measured network latency variance.

For example, the verifier and the audited system may be connected/communicate with each other in different ways through different types of communication channels. For example, the audited system and verifier may be on a same local network and wired to each other. The audited system and verifier could also be connected wirelessly, such as through WiFi or Bluetooth. The audited system and the verifier may share a register or a buffer. Due to the coupling, there will be latency between the audited system and the verifier when sending and receiving data. There may also be variance in the latency/delay. For example, if the connection between the audited system and the verifier is WiFi, then communication may occur immediately, or there could be collisions. Although the verifier controls sending of the seed to the audited system, the verifier may not know when the seed was received (e.g., the delay between sending of the seed and its receipt by the audited system). Further, there may be a delay between when the checksum result is sent from the audited system to the results reporting being received by the verifier. The delays in the communication of the seed and the checksum result are a measure of the flaw in measurement, by the verifier, of the time of the checksum process. If the malicious code's delay is much larger than the communication delta, then the presence of the attacker may be determined by the verifier. If, however, a delay (between the measured elapsed time and the expected time) is measured that is similar to the communication delay, then because of variances in communication, it may be difficult to determine whether the delay was due to communication or due to the presence of malware. For example, it may be possible that during a particular instance of execution of the checksum process, the communication delay itself was very short, and that the majority of the delay was due to the malware. Thus it may be difficult to determine whether the delay was due to malware or communication delay.

In one embodiment, in order to account for the communication delay and its variance, the checksum process is run/repeated multiple times (e.g., 100 times). For example, suppose that in the first run, the verifier measures two times. The first is a time between sending out the seed and receiving a checksum value from the audited system. The second time is a time for executing the checksum process itself. The delay between the two times is measured. If the delay is comparable to an expected communication delay (and not substantially larger, which indicates the presence of malware), then the verification process is run again (e.g., because it is not necessarily conclusive as to whether the delay was due to variance in communication delay or malware). If, however, over the course of numerous repeated verifications, none of the delays greatly exceed the communication delay, then it is unlikely that there is malware present on the audited system.

In some embodiments, the verifier makes a security determination based on the results of the verification. The security determination may not necessarily be an explicit indication of the presence or absence of malware, but may instead be a score indicative of a likelihood of the presence or absence of malware.

Multi-Processor Systems with Shared Caches

As described in the above example, all registers for a processor are utilized by the checksum process (e.g., for control of the process or for computing the checksum) in order to limit the amount of free resources that an attacker may have available. If an audited device includes multiple processors, then those processors are similarly utilized so that they are not available for use by an attacker. For example, suppose that the audited system includes two processors, each with its own set of hierarchical caches (or potentially, two processors may share a same shared cache). If the checksum process is run only on the first processor, then it is possible that there is malware on the second processor. If the checksum process is run on the first processor and then on the second processor sequentially, the attacker may move between the processors (residing on the processor that is not performing the verification), hiding itself from detection. Thus, just as all registers should be utilized, all processors should run the checksum process in parallel. Thus, the malware has no opportunity to execute and hide itself from detection.

In some embodiments, in a multi-processor system, during auditing of an audited system, all processors are made to execute different instances of the checksum program. The different instances each separately communicate with the verifier (e.g., as different auditing sessions, with potentially different seeds, hop lengths, etc. provided by the verifier). The different checksum programs correspond/communicate with the verifier in parallel. This allows multi-processor systems (where there may also be a shared cache between processors) to be audited. Mobile devices such as smartphones, networks such as Scala networks, etc., are but some examples of such multi-processor systems. As another example, a central processing unit (CPU) and a graphics processing unit (GPU) may have a cache shared between them. Both the CPU and GPU may be audited in parallel.

Figure 6:
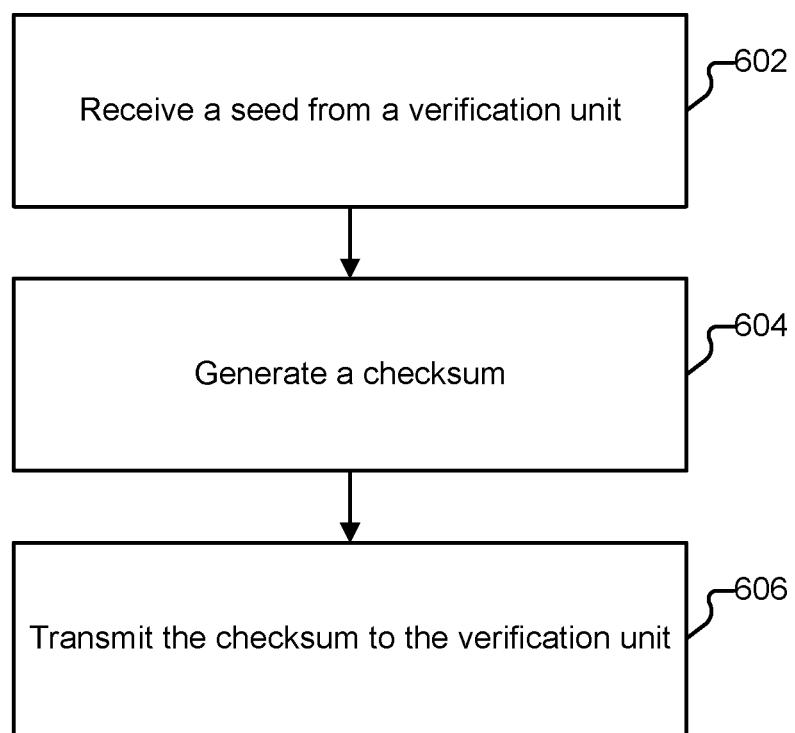
FIG. 6 is a flow diagram illustrating an embodiment of a process for rapid verification of executing programs.

FIG. 6 is a flow diagram illustrating an embodiment of a process for rapid verification of executing programs. In some embodiments, process 600 is executed by an audited system. In one embodiment, the audited system includes a processor that is coupled to a hierarchical memory that includes an instruction cache, a data cache, and a shared memory accessible by both the instruction cache and the data cache. The shared memory is configured to store an executing program (e.g., program that generates a checksum on itself). In one embodiment, the shared memory is a shared L2 cache that is shared between the instruction cache and the data cache, which may be implemented as L1 caches. In some embodiments, the audited system also includes a second memory unit (e.g., random access memory RAM or L3 cache), where the instruction cache and the data cache are faster than the shared memory, and the shared memory is faster than the second memory unit. In some embodiments, the size of the executing program is larger than the size of the L1 caches. For example, the size of at least one of the instruction cache and the data cache is insufficient to store the entire executing program. This causes flushing of the L1 cache to swap out memory with requests to the L2 cache. The executing program is of a size that fits in the shared memory. In some embodiments, the size of the executing program is greater than at least half of the size of the shared memory (such that only one copy of the executing program will fit in its entirety in the shared memory). As one example, the size of the executing program is such that the entire executing program just fits in or fills up the shared memory. By having the executing program take up at least the majority of the shared memory, during a redirect-based data substitution attack, L2 cache misses will be caused (because the legitimate and malicious versions cannot both fit in their entirety in the shared memory), and read requests will be redirected to a slower memory, introducing delays. In the presence of malware, as the checksum process of the executing program continues, delays will be accumulated, thereby allowing the presence of malware to be detected.

The process begins at 602, when an initial state is received from a verification unit. The initial state may be used to perform setup for the verification of the executing program. In various embodiments, the initial state includes a seed, a hop length, and a number of loops. In one embodiment, the hop length and/or number of loops is incorporated into the seed (e.g., the hop length is the last 10 bits of the seed). The hop length and/or number of loops may also be received separately from the seed. Another example of initial state includes the values used to initialize registers. In some embodiments, a register for the checksum is initialized to an initial checksum value.

At 604, a checksum is generated. One example of generating a checksum is as follows (e.g., as described in conjunction with FIG. 3). Memory is read (e.g., the contents of a selected L2 cache location are read to the L1 data cache). The memory that is read into the L1 cache is the data on which the checksum is to be computed. The read memory and the contents of a selected set of registers (also referred to herein as state registers) are combined with the state of the checksum. A location to jump or branch is determined based on the checksum state. As one example, the location is a power of 2.

The determined location corresponds to a location of an accumulator procedure that is included in a set of different accumulator procedures. The different accumulator procedures, when executed, each modify the contents of at least some of the selected set of state registers. The modifications are used to update or modify the checksum value. After performing the accumulator procedures, it is determined whether the checksumming is completed. If not, then the checksum process continues (e.g., another iteration of the checksum process is performed). If the checksum process is completed, then process 600 continues to 606. In some embodiments, the checksum is a function of the contents of at least one of a data pointer (DP), the program counter (PC), and a register. In some embodiments, the audited entity sends the program counter and data pointer to the verifying entity (e.g., so that the verifying entity may also use the program counter and data pointer when computing its own instance of the checksum process).

Further, the checksum program is implemented or constructed in a manner to reduce locality of reference, for both instruction and data reads. This causes flushing of the instruction cache and the data cache. For example, the data reads are performed according to a hop length (e.g., received at 602) that is longer than a cache line, preventing cache reuse, and requiring swapping of the L1 data cache.

At 606, the checksum is transmitted to the verification unit. In response to receiving the checksum, the verification unit makes a security determination based at least in part on the seed, the received checksum, and a time elapsed between when the seed was transmitted and when the checksum is received (where the measurements of elapsed time may be made by recording timestamps of when information is communicated between the verifying entity and the audited entity—an example of the communication between an audited entity and a verifying entity is described below in conjunction with FIG. 12). For example, the verifying entity determines whether the measured elapsed time exceeds an expected time.

The time elapsed may be measured as the time between when the seed was transmitted and when the checksum was received. In another embodiment, the time elapsed is measured as the time between when the seed was received by the audited system and when the checksum was transmitted by the audited system.

In some embodiments, the time elapsed between sending the initial state (e.g., seed) to the at least one processor and receiving the checksum is compared to a threshold, and the security determination indicates an attack if the threshold is exceeded.

In some embodiments, at least two checksums are computed in a consecutive manner, and associated security determinations are made for the at least two checksums, and a combined security determination is made based on the at least two security determinations (e.g., by performing multiple iterations to take into account network latency and variance).

In some embodiments, if the audited system includes multiple processors, instances of checksums are generated on each of the processors in the system. This may be performed to deny an adversary access to any resources. This may also be performed to compute multiple checksums at a time to determine a security determination.

In some embodiments, cascading verification is performed, where a series of systems/devices are configured to verify each other. For example, verification may start from a device known to be safe (e.g., hardware that is safely guarded), which then checks another device, which if determined to be safe, now becomes a verifier to verify a next system (e.g., in a network of devices). Thus, beginning with a starting point known to be safe, neighbors in a network may be configured to verify each other so that it can be verified if an entire network is free of malware.

An Example Solution Adapted for Systems without Split Caches.

The following is an example solution adapted for systems without split caches, or which are not affected by the attack described by van Oorschot. A system without a split cache corresponds to a computer architecture where instructions and data are cached by the same physical cache unit, or where there is no hierarchical cache, but only, for example, DRAM or corresponding memory. While these types of architectures are not common for traditional computers, phones and tablets, they are used for low-power processors such as smart cards, motes and other sensor nodes. In the description below, caches are still referred to with names corresponding to the names used above, but note that these may also correspond to other forms of storage, such as DRAM, and that the L1 instruction cache may refer to the same physical unit as the L1 data cache. The solution described below may also be used to audit a system if the system is unable to allow redirects of the type described in van Oorschot et al. In such a scenario, the solution described herein performs faster than existing techniques, allowing for rapid and more efficient auditing.

In one example embodiment, the core portion of the auditing or checksum process fits in the L1 cache. In some embodiments, an assumption is made herein that the L1 instruction cache is of the same size as the L1 data cache, or that they are combined into one unit. In some embodiments, the core portion of the process is not significantly smaller than the size of the L1 cache, but roughly of the same size. Here, the core portion of the process corresponds at the very least to the loop that is executed for each portion to be checksummed. In some embodiments, it is possible, but not necessary, to allow some process setup tasks not to be part of the core process.

Example Component of the Core Portion of the Process.

The following are five example distinct components.

A first example component selects the position to be checksummed and reads the contents of this cell. If the audited system has distinct L1 instruction and data caches (which is typical on most systems), then the execution of the steps associated with the first component will cause the associated processor(s) to read the content of one cell of the L1 data cache, storing the result in a register associated with the processor. In a system with a combined L1 cache, the content of a cell of the combined L1 cache is read and the result is stored on a register associated with the processor.

The second example component computes, based at least in part on one of a state and the result stored in the register, a value in a range, where the range may correspond to the number of branches utilized in a third example component, described in further detail below. One example way of performing this computation is to truncate the state, the result stored in the register, or a combination of these. Another example way of performing the computation is to select a segment of bits from the state, the result stored in the register, or a combination of these, where the selection can be performed, for example, by a bitwise AND with a mask.

A third example way is to compare a first value derived from the state, the result stored in the register, or a combination of these, with a second constant value associated with the range, and subtract the second value from the first if the first value is greater than the second. One practical example implementation combines two of these ways, e.g., by first selecting a portion and then comparing the selected portion to a second value, subtracting the second value from the selected portion if the selected portion corresponds to a numerically greater value than the second value. For example, if the second value is 950, and the state and the value stored in the register are combined using a combination function such as bit-wise XOR, then the selection step may select ten bits of the combined values, resulting in a value between 0 and 1023; this value is then compared to 950, and if it is greater than 950, then 950 is subtracted from the value. If the selected value is, for example, 554, this would be the computed value, while if the selected value is 980, then the computed value is 980−850=30. In one alternative embodiment, the state and the value in the register are not combined, and only one of these is used to perform the computation of the second component.

A third example component involves branching to a code segment corresponding to the value computed in the second example component. For example, if the computed value is 554, and the maximum admissible value is 950, then there will be 951 branch locations, numbered 0 through 950, and the 554th such location will be branched to. This is an example of a multi-branch. In one example embodiment, each of the code segments to be branched to are of the same code length. If this length is, for example, four cells, where a cell corresponds to a unit such as a byte or may correspond to another addressable location, then the branch may be performed by taking the value computed in the second segment and multiplying it by four, after which a relative branch corresponding to that number of cells is taken. In one example embodiment, multiplying by four is performed by shifting the input value twice. In another example, if the length is eleven bytes then the value computed in the second segment is multiplied by eleven and a relative branch is performed corresponding to this result. In some embodiments, instead of relative branches, branching to an absolute location is performed, where, for example, this is computed as the product of the value computed in the second segment and the value corresponding to the length of each branch element, and adding an offset to the result where the offset corresponds to the absolute location of the first portion to be branched to (i.e., corresponding to the value 0 being computed in the second example component). Note here that shifting twice to multiply by four takes the same amount of time, no matter what value is being multiplied, whereas multiplying by eleven may have an execution time that depends on the value being multiplied, depending on the exact algorithm.

In some embodiments, it may be slightly more practical to use algorithms whose computational time is independent of the value being multiplied, but if an algorithm whose computational effort depends on the input is used, this can either be taken into consideration on the verifying entity, for example, by determining, for each computation, how long it should have taken, or by adjusting a margin used to determine whether a computation has taken longer than expected.

In one embodiment, an indirect branch or a register-indirect branch is used to implement the branching of the third example component. For example, the ARM instruction set includes the instruction mov pc, r2 to update the program counter pc by the contents of the register r2.

A fourth example computational component includes a number of code elements, where, in some embodiments, each one is of the same length, where each such element modifies the state, but not all elements modify the state in the same manner; and where each element ends in a branch to a location corresponding to a fifth example component of the auditing or checksum process, described in further detail below. Here, in this example, some but not all of the code elements will modify the state using a first operation, whereas some but not all of the code elements will modify the state using a second operation, where the two operations are not commutative. In other words, if f1 denotes the first operation and f2 denotes the second operation, then f1(f2) is not equal to f2(f1) for all sets of inputs. In other words, when two operations are not commutative, that means that the order of the two operations matter, i.e., a first operation followed by a second operation generates a different result than the second operation followed by the first operation.

An example of a first operation is to XOR a value to the state, and an example of a second operation is to shift or rotate the state a fix number of steps. An alternative example of a first operation is to combine the state and the value in the register by XORing them and then XORing a first mask value, while the second operation is to combine the state and the value in the register by XORing them and then shift or rotate the result one bit, moving the most significant bit to the least significant location. At the same time, in one example embodiment, at least some but not all of the code elements combine the program counter with the state; at least some but not all combine the data pointer with the state; and at least some do neither. For example, in a simplified example in which there are only eight branch locations, the code elements of these may be as described by the following example pseudocode:

Code element 0: XOR the state with a mask with the constant value 38, then branch to the location corresponding to the fifth component.

Code element 1: XOR the state with a mask with the constant value 278, then branch to the location corresponding to the fifth component.

Code element 2: Rotate right the state three steps, then branch to the location corresponding to the fifth component.

Code element 3: XOR the state with the program counter, then branch to the location corresponding to the fifth component.

Code element 4: Rotate left the state two steps, then branch to the location corresponding to the fifth component.

Code element 5: XOR the state with the data pointer, then branch to the location corresponding to the fifth component.

Code element 6: XOR the state with the flags register, then branch to the location corresponding to the fifth component. In some embodiments, this facilitates detecting attacks in which an adversary turns off the interrupts.

Code element 7: XOR the state with the program counter, then branch to the location corresponding to the fifth component.

The above example is simplified in that, for example, it only performs one principal operation per element, whereas it is also possible to perform multiple principle operations; also, it is simplified in that, for example, the code length is not the same for all the code elements. In some embodiments, to make shorter instances the same length as the longest element, additional instructions are added that manipulate the state to each element until all the elements have the same code length. If the location of the fifth component, for example, immediately follows after the last of the code elements, then the last code element does not have to contain a branch operation. In some embodiments, the execution time of each code element should be the same under the expected execution conditions in which there are no cache misses; however, this may not be necessary, as differences can be compensated for by the verification entity by having this entity determine the expected execution time depending on what collection of code elements are processed in a particular instance, and knowledge of the execution time of each one of these under the expected execution conditions.

In some embodiments, the fifth component determines whether additional rounds of computation should be performed, and if so, iterates by branching to the code for the first component. The location to be read may be either updated in the first or the fifth component, causing a new location to be read for each sequential iteration. In some embodiments, the fifth component is configured to cause the exact number of rounds corresponding to the length of the process (i.e., the entire process is being checksummed, each byte of which is read exactly once for this checksumming) or additional times (e.g., the entire process is processed a total of six times, creating a checksum that is, in effect, the checksum of the process appended to itself to a length corresponding to six times the size of the original process).

In a system with multiple cores, or processors, the above computation is, in some embodiments, performed for each one of the cores. If the cores have different types of L1 cache or different processor speeds, then, in some embodiments, each one will have an associated configuration for the auditing or checksum process that matches the hardware. If there are multiple cores, then each core can use a different starting state; e.g., core number i may use the starting state of seed XOR i, where the seed, for example, is a value provided to the audited entity by the verifying entity as an input, and where the seed, in some embodiments, is a priori unpredictable to a process that did not generate it. The seed, in some embodiments, may be generated by the verifying entity using a pseudo-random generator initialized with a secret value.

In addition, in some embodiments, the auditing or checksum process includes a setup component which is executed before the other components are executed, and which includes an instruction that turns off all interrupts. In one embodiment, at least one of the code elements in the fourth segment also includes an instruction that turns off the interrupts, in spite of the fact that this instruction should already have been executed in the setup component. In some embodiments, the setup component also includes a communication element in which the audited entity receives an initial state from an external entity such as the verifying entity. This initial state is also referred to herein as the seed.

Furthermore, in some embodiments, the auditing or checksum process also includes a conclusive component, in which at least part of the state is communicated to the verifying entity or an entity associated with this. In addition, in some embodiments, the conclusive segment is in charge of starting up the process to be executed after the verification has completed; in one embodiment, that includes loading a preferred set of processes; verifying that they have not been manipulated (e.g., by verifying that they correspond to known hash values or digital signatures); setting the interrupt registers to allow these preferred processes to execute once the interrupts are turned back on; and then turning the interrupts on. In an alternative embodiment, the conclusive segment includes code to be executed in a secure state, after which interrupt registers and interrupts are restored. The conclusive segment, in some embodiments, performs its computation in a manner that is conditional on a result sent to the audited entity by the verifying entity, and where this result is selected based on whether the audited entity is considered safe or not. The result in question may be a cryptographic key that unlocks a vault, but which is only transmitted to audited entities that pass the verification.

The state, as described above, is, in some embodiments, kept in multiple registers associated with the processor executing the process. Many processors may have 32 registers. It is beneficial to use as many as possible of these in the process. The reason for this is that using the registers to store portions of the state makes it difficult or impossible for a malware process to use the registers to store information useful to attempt to circumvent detection. For example, and as will be described in more detail below, a malware process that can store a large table with branching locations obtains a speed benefit in comparison to a malware process that has to store such a table in cache. One reason for this is that the process will fill the cache, or nearly so, and therefore, storing additional data in cache will cause swapping, which in turn causes a delay. Therefore, by having the process use a large number of registers, these registers are no longer available to a malware process, or are difficult to access. One example way to use a very large number of registers includes instantiating these registers in the setup component, for example, based on the initial state value received from an external source, such as the verifier. For example, this initial state may include a set of values to be assigned to various registers; it may also include just one value that is assigned to all registers. Different state-holding registers may then be modified in different code segments. For example, a first register may be modified as a result of the read instruction in the first component, and the value in this register combined with the contents of the state described in the second component, where this state element is stored, for example, in a second register. In some embodiments, the state associated with the second register is used for the selection of the branch location in the third component. The different elements of the fourth component, each one corresponding to a unique branching location, in some embodiments, modify registers, but not all such elements may modify the same registers. In some embodiments, the contents of the registers are used to modify the contents of the second register in at least one of these code elements in the fourth component. In some embodiments, in the conclusive segment, the contents of different registers are combined to generate the value that is transmitted to the verifying entity. Thus, when the state is referred to as being read or the state being modified, this indicates that at least a portion of the state is being read and at least a portion of the state is being modified.

In one example, suppose that the L1 caches—both the L1I and the L1D caches—are 4 kByte large, and comprise cache lines, each one of which is 64 Bytes of size. Each cache line, in turn, includes a series of cells. A cell, in this example, is 1 Byte of size. In some embodiments, an instruction includes one or more cells, depending on the instruction. In this example, the setup component turns off interrupts, initiates variables such as the loop counters, and receives a state from the verifier, which, in some embodiments, is done by reading a value from a register or a shared buffer. In this example, the setup component has a size of 80 Bytes. The first component, in this example, is 20 Bytes long, and the second component is 8 Bytes. The third component is 36 Bytes. In this example, the fifth component is 30 Bytes, and the conclusive component is 108 Bytes. In this example, the core of the process includes components two, three, four and five. Based on the above numbers, the size of these components is $8+36+x+30$, where x is the size of the fourth component. In order to make the core mostly fill the cache, it is desirable that $8+36+x+30=4096$, where 4096 is the number of Bytes of the L1 cache; this corresponds to $x=4022$. In this example, an assumption is made that the size of each element in component four is 7 Bytes, including the branch at the end. Thus, since 4022/7 is slightly more than 574, the range for the branching options is represented by a number between 0 and 573, including the endpoints. This corresponds to the cache being full, but for four bytes. These four bytes may be filled by data from the first, setup, or conclusive component, or a combination of these, based on the memory layout. In some embodiments, they are automatically filled since the cache is read by cache line. Executing the process would cause cache misses as the process is first loaded, and as the conclusive portion is loaded at the end.

In an alternative example, the process is configured so that all components, including the setup component, the first component, and the conclusive component—and all components corresponding to the core of the process—fit in the cache at the same time. This has the benefit of avoiding cache misses as far as is possible. Since the setup component, first component, and conclusive component have a combined size of 208 Bytes in this example, this corresponds to $8+36+x+30+208=4096$, or $x=3814$. This corresponds to a total of 544 different branching alternatives in the fourth component, leaving 6 bytes as the "leftover" or remainder. In some embodiments, these can be filled by adding a segment of code or data to one of the components. For example, it may be added to the conclusive component, or it may be added to the very last element in the fourth component.

In some embodiments, it is not necessary to entirely fill the cache, but it may be beneficial. In an alternative embodiment, the size of the process does not cause the cache to fill in its entirety, but causes the cache to be close to full, or be filled to a sufficiently large extent that adversarial attacks remain difficult. Filling the cache in its entirety may enhance the ability to ensure or guarantee security associated with the process, and for purposes of illustration, filling of the cache is performed.

The second example described above is used here as an example to review the computational efficiency of the process. In the second example, the entire process fills the L1I cache. As the process reads its own memory space (i.e., checksums itself), the L1D cache will also contain the process, and will also be full. In one version of this example, the entire process is read and checksummed, but only once, according to the configuration of the process. This means that the core is iterated 4086 times, once for each value that is being read from the L1D cache. In some embodiments, for each such loop, the entire first component is executed; the entire second component is executed; the entire third component is executed; and exactly one of the elements of the fourth component; and the entire fifth component is executed. For exemplary purposes, suppose that the time to execute the first component is 10 cycles, the time to execute the second is 4 cycles, the time to execute the third is 22 cycles, the time to execute one element of the fourth component is 4 cycles, and the time to execute the fifth component is 18 cycles. The exact execution time may depend on the instructions used, where various types of instructions may be used in the process. In this example, the execution time per round of the loop is therefore 10+4+22+4+18=58 cycles, corresponding to a total execution time for the core of 58*4096=237568 cycles. On a computer with a 3.40 GHz processor, this corresponds to an execution time of $237568/(3.4*10^9)$ seconds=69.8 microseconds. This does not include the time to execute the setup component, the first component, or the conclusive component, but since these components are relatively short and only executed once, the execution time that has been computed is a close representative of the actual computation time to run the process.

When evaluating a best possible adversarial strategy to generate the correct checksum in as short a time as possible, one possible approach is to use a modified version of the process (i.e., what is referred to herein as a malware version of the process) to compute a correct checksum, computed not on the modified process (since this would yield the wrong checksum) but on the correct process. Thus, this malware process would be loaded, at least in part, into the L1I cache, whereas the correct process would be loaded into the L1D cache. In some embodiments, this causes the attacker a problem: in some of the elements in the fourth component, the state is modified using the data pointer (DP), and in other elements, the state is modified using the program counter (PC). In an "honest" execution scenario, both the DP and the PC are from the same area in the memory address space, namely the area that contains the correct process. However, in the malicious scenario, the DP and the PC are from different memory spaces, at least part of the time. In some embodiments, this would cause at least one of the state modifications—that depending on the DP or that depending on the PC—to cause an outcome that is different from the expected outcome. In such a scenario, the verifier is able to determine whether a reported state is correct or not by computing the state (using the correct, non-malicious process) and comparing the received value to the computed value; therefore, this type of malware is detectable by the verifier since the reported state would be incorrect. To address this, the malicious process needs to modify the computational elements where the state is modified by the value of the DP and/or the PC. For example, if the malware is directly adjacent to the legitimate process in the memory space, then the expected PC or DP will differ by exactly 4096 in the case where the entire process is of length 4096 Bytes. In this case, a reference to either the PC or the DP would need to be offset by 4096 to cause the expected modification to the state, as opposed to a modification that is based on the actual DP and/or PC. Assume, for illustrative purposes, that any time the PC value is to be used in the computation of the checksum, then the value 4096 needs to be subtracted from the "measured" PC value. This may not be difficult: for example, the malware can copy the PC value to a register, then subtract 4096 from the value in this register, then use this register to modify the state, instead of using the PC. However, doing this has two important consequences: first of all, for all the element instances where the PC is used to modify the state, these additional two instructions need to be executed: copy the PC to the register, subtract 4096 from the contents of that register. If 5% of all of the elements in component four uses the PC, then in 5% of the time, an additional two instructions need to be executed. Assume for simplicity that this adds two cycles to those cases. Assuming all elements are selected with the same probability, this causes an expected 0.05*2=0.1 cycles to each iteration. Using the example above in which one iteration was computed to take 58 cycles, this new version would have to take 58.5 cycles on average, which corresponds to an approximate 0.9% increase of the execution time, or approximately 0.6 ms. Thus, even if the malware were to always produce the correct checksum, it would be detected by the verifier as long as an increase of 0.6 ms is detected by the verifier. The granularity with which increases of time can be detected may depend on the natural variance of the time, which may be based on the variance in the communication time as well as the impact of regular but unpredictable hardware events, such as memory rewrites, which are performed periodically to avoid many types of memory from losing the charges that correspond to the data they hold. To address this technical challenge or problem, in one example embodiment, the number of rounds of checksumming that are performed is increased. For example, if each portion of the checksum process is being checksummed exactly ten times, back to back, and the time for the full ten times is measured, then the impact of an attack would increase tenfold, thereby dwarfing smaller variance.

However, the delay caused by malicious modification may not be limited to the extra time of performing the subtraction above. Since introducing this subtraction will cause the element to become larger—potentially growing, for example, from 7 bytes to 10, the malware needs to compensate for this, too. In some embodiments, this is relevant in the context of performing the branching in component three. For example, instead of each component taking exactly 7 bytes, they may be laid out to take exactly 11 bytes, which would force the malware process to multiply the selected value by 11 instead of 7. Assume, for example, that this operation (multiplying by 11 instead of 7) does not take more time. However, while the correct process has a third component that in the example above includes 544 different elements, each one of which needs 7 bytes, the malware now has a third component that includes 544 elements, each one of which uses 11 bytes. The malicious process is then 544*4=2176 Bytes longer than the legitimate process. As a result, it will not fit in the L1I cache. Assuming the most optimistic case for the malware, the non-core components will be thrown out of the cache and replaced by some of the additional-space elements. However, since component four takes up the absolute greatest portion of the cache space, this has a minor impact. Therefore, the computation may be simplified by assuming that random components are replaced. Then, the probability that the process will need a component that is not in the L1I is 2176/(2176+4096), or approximately 35%. In these cases, an element that is stored outside the L1I has to be loaded. Since branch predictors will not work in this situation, there will be a delay while the new element is loaded to the L1I. This is typically on the order of 10 cycles. Since this event happens with a 35% probability for each iteration, that causes an expected 3.5 cycle delay per iteration, which constitutes, in this example, 3.5/58 or approximately a 6% increase of time. In some embodiments, such an increase in time is easily detectable by the verified. Indeed, the problem may actually be worse for the malware, since the elements do not coincide with cache lines, and thus, there will sometimes be two cache lines that have to be replaced for one element to be loaded.

In some embodiments, the above delay is for one particular adversarial strategy. It is also possible for the malware to hold a lookup table of the entry-points for the different branches, as opposed to multiplying the selection with a multiplier value to arrive at a branching location. This makes for more efficient memory management, as the elements can be tightly packed. In some embodiments, this is a branch table. However, now the branch table has to be stored. Since each entry has to be a number between 0 and 4095 (in the case where the cache is 4 Kb of size), and there are 544 elements in this example, the table needs to be of size $\log_2(4096)*544=12*544=6528$ bytes. This results in an even greater impact on the delay, as this would cause even more substantial swapping.

Finally, an attacker could resort to hoping that none of the elements that use the PC would be used for a particular execution. However, assuming a uniform distribution over the different possible elements, it can be seen that the probability for this is very limited. Suppose, for example, that 10 out of the 544 elements use the PC. This means that the probability of none of these being hit as the checksum is computed is $(534/544)^{4096}$, which is a number smaller than $10^{-33}$. This also shows that the probability of being "lucky" depends also on the number of elements that use the PC. The same applies for the number of elements that use the DP.

Using a variety of different operations and operands for the different elements is beneficial to gain security; also, in some embodiments, it is beneficial that there is no structure. For example, if all of the last 20 elements used either the DP or the PC, but no other elements do, then this would simplify the job of a potential adversary. Therefore, a seemingly random distribution of what elements perform what actions is beneficial. Moreover, it may be helpful if the operations of a large number of elements are non-commutative, as this blocks an adversary from pre-computing segments of operations. This goal may also be achieved by the fact that the execution path is not knowable a priori: the selections that determine what elements are executed and in what order may depend on the initial state.

In one embodiment, the component code for at least one of the components of the process is client-specific, where an attacker that manages to find a vulnerability in one client setup will not necessarily find it in another. In another embodiment, a client has at least two different processes, of which the verifier can choose to run one or both for one particular verification. In some embodiments, if the audited system, i.e., the client system, has multiple cores, then a core-specific process may be run on different cores.

The techniques described herein provide a variety of security benefits. One example benefit is that a process that attempts to compute the correct output for a large portion of inputs would be substantially larger than the process intended to compute the checksum computation. As this second process, which is a malicious process, runs, it causes a measurable delay in relation to the time the first, or legitimate, process would have taken to compute this checksum. In some embodiments, this measurable delay is detected by the verifier entity, which determines that the first and legitimate process must have been replaced by the second and malicious process, despite the correct response being computed by the process. Seen from another perspective, this is a benefit associated with the creation of a structure for the first process which generates a response to a challenge, and where the code expression of this generation has the properties that it is compact; requires substantial changes to make any one modification without causing the result it computes to be different from the expected result with a large probability. One example technique to achieve this is a technique for amplification of changes that forces a second code segment to be changed in a way that is associated with an expansion of size as a result of the modification of a first code segment modification. Another example benefit is to sequentially use two non-commutative operations to generate a result that is a non-linear accumulator, making pre-computation efforts impossible to be used to start the computation associated with the process before its input has been obtained.

In one embodiment, the auditing entity cannot control the address location associated with the process, but instead reports this location to the verifier by transmitting values corresponding to at least one of the PC and the DP to the verifying entity. In some embodiments, this is done during any one of the components, but may be done in the setup component, before the input seed value is provided to the process on the audited entity by an external entity such as the verifying entity. In some embodiments, this location information is used by the verifying entity to compute the checksum, which in one embodiment depends in part on the values of DP and/or PC, and which is used to verify the correctness of the checksum value generated by the audited entity.

In one embodiment, the PC and DP are not provided as input to the checksum computation, but the process, in at least one of its components, sets the DP as a function of the PC, and in at least one of the elements of the fourth component, an operation is performed that affects the checksum and which depends on the content of at least one of the cells of the process in which the DP is set as a function of the PC. Thus, an attacker that wishes to change how the DP is set needs also to modify the computation in the above-mentioned element, which causes instructions to be added to the associated element, therefore causing this element to become larger, and thereby causing the growth or spacing of other elements of component four. Similarly, in some embodiments, in at least one of the instructions of the legitimate process, the interrupts are turned off or the interrupt table is modified to remove processes other than the checksum process; if an adversary removes this instruction (or removes or changes any other instruction), then it also has to add instructions whose goal it is to avoid detection of this by modifying the manner in which the checksum is computed. Any changes that cause other changes to be made in order to evade detection may have an avalanche effect, increasing the size of the process, and thereby causing at least one L1I cache miss, which is detected by the verifying entity, as it increases the execution time of the process. The techniques described herein therefore enable detection of malicious changes by detecting if a process is roughly as large as the L1I cache, when the changes cause the increase of the size of the process, and thereby resulting in at least one cache miss that would not have been caused by the legitimate process. In some embodiments, the legitimate process is designed to cause a predictable and low number of cache misses. In some embodiments, to minimize this number, one approach runs the process at least twice in a row, reporting checksum values resulting to the verifying entity, where the second checksum is a function of another seed value different than the first checksum, and where there should be no cache misses associated with the second iteration of the process. In some embodiments, this is facilitated by the back-to-back execution of the process twice in a row, starting from the part of the process where a new seed value is received and up until the part of the process where the checksum result is transmitted to the verifying entity. In some embodiments, the two seed values are independent of each other. The cache misses associated with the first iteration would result from the loading of the process into the cache, whether instruction cache or data cache. However, in an alternative embodiment, the verifying entity knows that none of the process is loaded into the L1 caches of the audited entity before the process is called, and therefore, that each cache line would have to be loaded into both caches. However, while this results in cache misses which cause delays, these delays are predictable and therefore not a cause of error or false alerts; in some embodiments, it is any cache miss beyond the predictable cache misses that would be considered a delay. In some embodiments, ensuring that the caches do not contain the process at the beginning of the computation of the checksum is performed by running another process immediately before the checksum is to be computed. Instead of running the process twice in a row, other techniques can be used to warm up the cache.

In one embodiment, the last instruction of each of the elements of the fourth component causes the first instruction of the fifth component to be executed next. In an alternative embodiment, at least one of the elements of the fourth component does not have a jump instruction at the end, but causes the execution of the next element to be performed.

In some embodiments, the techniques described herein are based on the property of avalanche. In some embodiments, the avalanche property corresponds to a first routine and its corresponding memory space that, if modified, forces the modification of at least one other routine or its memory space, where the memory space is defined as the portion of the memory that the routine either occupies or renders unusable by memory segmentation. In some embodiments, an avalanche caused by the modification of a routine is detectable if the effect of the avalanche on the memory space of a process of which the routine is part is such that the process fits in a cache if the routine is not modified, but does not fit after the modification of the routine has caused an avalanche that results in the modified process being too large to fit in the cache. In some embodiments, the increase of size of the process as a result of the avalanche is dramatic. For example, if the increase of size corresponds to at least 10% of the cache size, this means that approximately 10% of all memory accesses to the process would result in a cache miss when executing the modified process, whereas no cache misses would occur for the unmodified process. By measuring the execution time to compute a value in response to a challenge value that is referred to as the seed, an external entity such as the verification entity may determine whether a target machine, referred to herein as the audited entity, is running the unmodified process or a modified process. This is because the modified process will either produce the wrong result with a large probability, or will take substantially longer to generate the result, due to the large number of cache misses. A further example aspect of the techniques described herein includes techniques that minimize the efficacy of cache prediction algorithms. In some embodiments, a cache prediction algorithm determines what line is needed to be loaded as a result of a cache miss, prior to the cache miss taking place. Typically, cache prediction algorithms work by predicting branches in a pipelined architecture. Cache prediction algorithms fail when an unpredictable value is loaded and then used for selecting a branching location. While cache prediction algorithms can fail to different extents (i.e., with different probability), they typically fail more noticeably when the number of possible branch locations is great. That is because it will be very unlikely that the right branch is predicted in such a situation. Therefore, a system including a unit loading a value and then using this value to determine the location to branch to, where a very large number of possibilities are possible, renders cache predictors unable to correctly predict the branches. While this is not necessary for the disclosed system to work, it enhances the impact of the delay caused by an avalanche, since each cache miss results in a greater delay when cache predictors fail.

In some embodiments, if the verifying entity determines that the checksum is correct and that it was computed in the expected amount of time, then it concludes that the audited entity is not corrupted by malware; conversely, if the verifying entity determines that the checksum is not correct or that it was computed in an amount of time exceeding the expected amount of time, then it concludes that the audited entity is corrupted by malware. In some embodiments, the verifying entity determines whether the checksum is correct by computing it itself, using, for example, the same input used by the audited party, and using the same process used by the audited party. In some embodiments, the time is measured by computing the difference between the time of a second transmission, from the audited entity to the verifying entity, of the checksum value, and a time of a first transmission, from the verifying entity to the audited entity, of the seed value that is used as part of the input to the checksum computation. This is referred to herein as a roundtrip. In some embodiments, these two times are both measured by the verifying party, and the difference is a measure of the computation time for the audited party, plus the communication time of the values of the first and second transmissions. In some embodiments, if the communication channel used for transmission of these values is predictable in terms of the time it takes to communicate, then the verifying party can measure the time of a collection of roundtrips, as described above, during a condition when the audited system is known not to be corrupted, and then set a threshold based on these roundtrip times that corresponds to the maximum time the computation is allowed to take without the verifying entity concluding that the audited entity is corrupted. For example, suppose that ten roundtrip times for a known, corruption-free audited entity are 0.92 ms, 0.92 ms, 0.91 ms, 0.94 ms, 0.90 ms, 0.95 ms, 0.93 ms, 0.92 ms, 0.93 ms, and 0.94 ms. As shown, the computation time is not more than 0.91 ms, and the communication time may be at least 0.04 ms. In this example, the verifying entity may set the threshold at 0.96, which means that all of these ten runs would have been accepted. In some embodiments, if the threshold is set too low, a malware-free execution may be incorrectly classified as a malware-infested execution. Therefore, if the measured roundtrip time exceeds the threshold at a later test time, then the verifying entity may request re-testing. An alternative approach to setting the threshold is to determine how long a malware affected process would have to take for each known and meaningful candidate way of creating the correct checksum, and make sure that the threshold is lower than this time. In some embodiments, both of these techniques are applied.

In some embodiments, if the audited party includes multiple processors, where each processor computes a checksum, then the verifying party determines, for each processor, whether it is compromised by malware or not, and concludes that the audited entity is free from malware if and only if each of its associated processors is free from malware.

As used herein, the term "malware" includes any undesirable process executing when the verifying entity attempts to verify that the audited entity is not corrupted. In various embodiments, the audited entity may be a server, a desktop computer, a wireless device, or any other computational device with a processor and a cache. In some embodiments, the verifying entity may also be a server, a desktop computer, a wireless device, or any other computational device with a processor and a cache. The verifying entity may be housed in a separate physical unit from the audited entity, or in the same unit. An example of the latter case (same unit) is when the verifying entity is implemented as a firmware unit running on a processor drawing power from the same power source as the audited entity does. Another example is a process running in a secure enclave of a general-purpose computer of which the audited entity is a part of. In some embodiments, the verifying entity is attached to the audited entity as a dongle or a card, and may be part of a modified communication unit, in which case the verifying entity may be used to control all communication between the audited entity and its surrounding world, or all communication on a channel associated with the communication unit. In this situation, the verifying entity may control all communication the audited entity is involved in to ensure that it cannot communicate with other entities if it is corrupted by malware.

Figure 7:
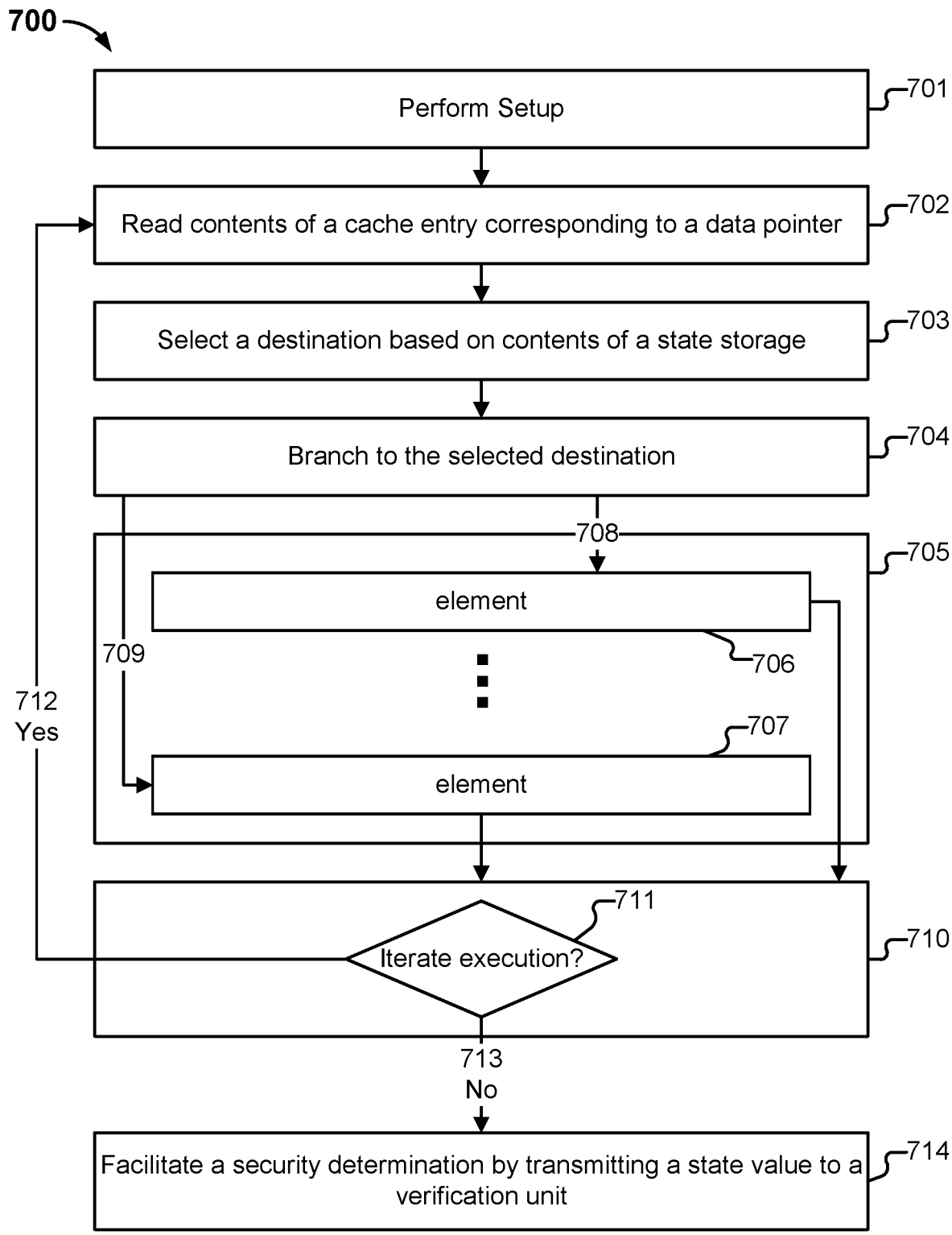
FIG. 7 is a flow diagram illustrating an embodiment of an auditing or checksum process.

FIG. 7 is a flow diagram illustrating an embodiment of an auditing or checksum process. In the example shown, process 700 includes a setup component 701, a first component 702 that reads the contents of the cache entry corresponding to the data pointer, a second component 703 that makes a selection of a destination based on the contents of a state storage, and a third component 704 that branches to the destination determined by the second component 703. In this example, a fourth component 705 includes at least two elements (e.g., accumulator procedures) 706 and 707, corresponding to the destinations of the at least two destinations that are branched to in the third component. These branches correspond to the changes 708 and 709 of the program flow. After element 706 is executed, it jumps to a fifth component 710. After element 707 is executed it also jumps to the fifth component 710. The fifth component 710 includes a comparison 711 to determine whether to iterate (712) execution of the first component 702 or to continue (713) by executing a concluding component 714. The concluding component 714 facilitates a security determination by transmitting a state value to a verification unit.

Figure 8:
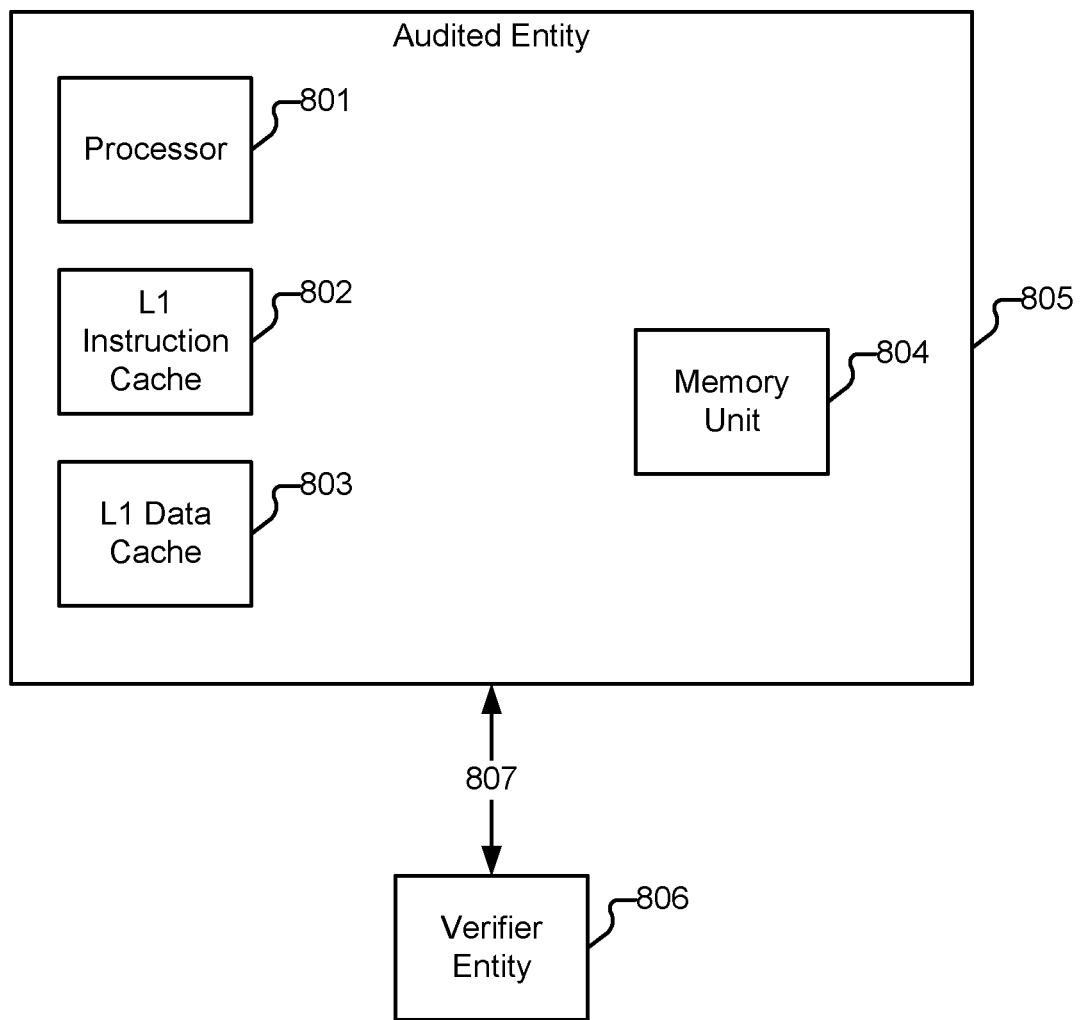
FIG. 8 illustrates an embodiment of a system for rapid verification of executing processes.

FIG. 8 illustrates an embodiment of a system for rapid verification of executing processes. Shown in this example are an audited entity 805, a verifier entity 806, and a communication channel 807. Examples of communication channels are a bus, a shared port, an Ethernet connection, a serial wired connection, a parallel wired connection, a wireless connection, or any combinations of these.

In some embodiments, the audited entity 805 includes at least one processor 801, at least one L1 instruction cache 802, at least one L1 data cache 803, and at least one memory unit 804. Examples of memory units include an L2 cache, an L3 cache, DRAM, other RAM storage, secondary storage including flash memory, a hard drive, and tape storage, or any combinations of these. In some embodiments, the process 700 of FIG. 7 is initially stored on memory unit 804, and when activated, is loaded into L1 instruction cache 802. In some embodiments, as the process 700 is executed by processor 801, the process 700 is loaded into the L1 data cache 803 and process 700 computes a checksum on the data in the L1 data cache 803 corresponding to the process 700. In some embodiments, the checksum also takes as input a value obtained by the audited entity 805, for example, from the verifying entity 806 using the communication channel 807. In some embodiments, the checksum is kept in a state storage associated with audited entity 805. After the checksum is computed, in some embodiments, it is transmitted over communication channel 807 to verifying entity 806, which performs, for example, a security determination.

Figure 9:
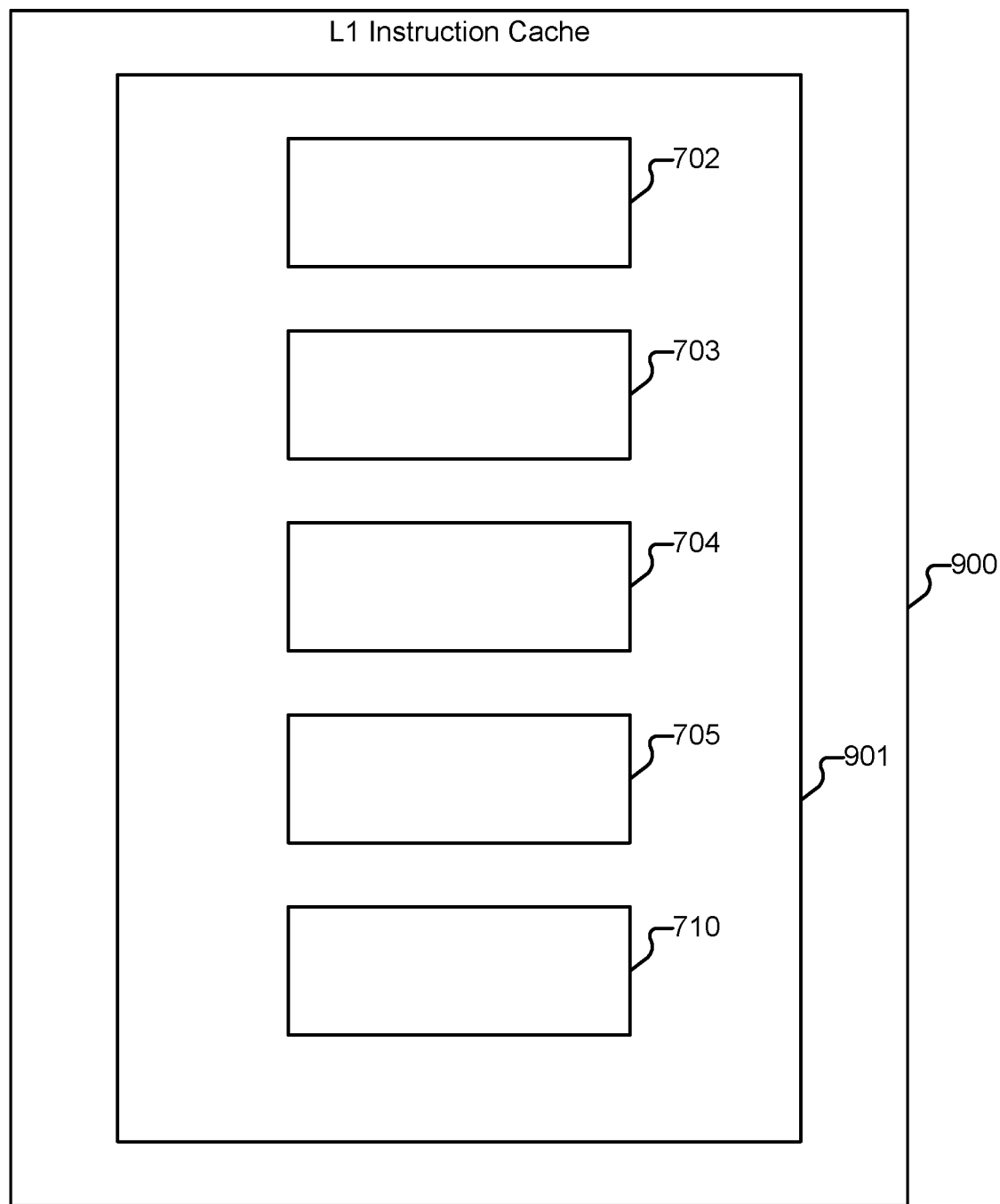
FIG. 9 illustrates an example embodiment of an L1 instruction cache.

FIG. 9 illustrates an example embodiment of an L1 instruction cache. In the example shown, L1 instruction cache 900 is loaded with at least a portion 901 of process 700, where, in this example, the portion 901 includes first component 702, second component 703, third component 704, fourth component 705 (which may include components 706 and/or 707), and fifth component 710, as described in conjunction with process 700 of FIG. 7. In some embodiments, L1 instruction cache 900 is the same as L1 instruction cache 802.

Figure 10:
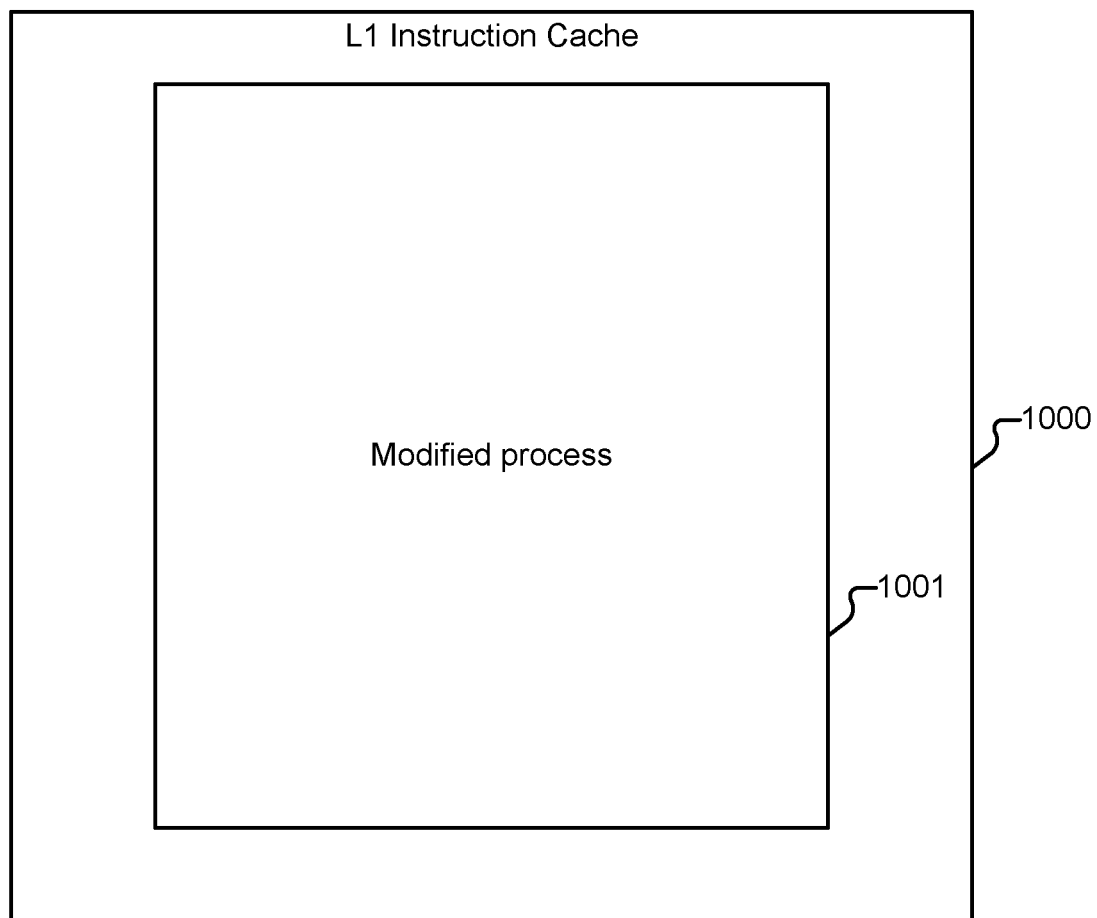
FIG. 10 illustrates example embodiments of an L1 instruction cache and a memory unit.
Figure 10:
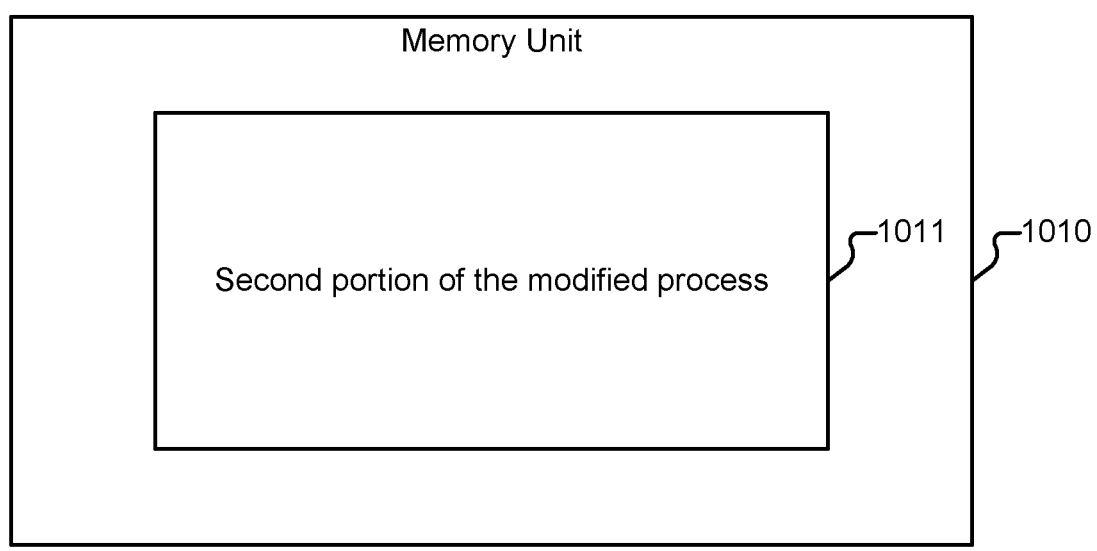

FIG. 10 illustrates example embodiments of an L1 instruction cache 1000 and memory unit 1010. In some embodiments, L1 instruction cache 1000 is the same as L1 instruction cache 802 and memory unit 1010 is the same as memory unit 804. In the example shown, L1 instruction cache 1000 is loaded with at least a first portion 1001 of a modified version of process 700, where the modified version of process 700 generates the same checksum value as process 700, but does not have the same exact sequence of instructions as process 700. In some embodiments, L1 instruction cache 1000 is not large enough to contain the entire modified version of process 700, but at least a second portion 1011 of the modified version of process 700 is stored in memory unit 1010. In some embodiments, when a processor such as processor 801 is scheduled to execute a portion of the modified version of process 700 corresponding to the first portion 1001, then this does not result in a cache miss. However, in some embodiments, when the processor 801 is scheduled to execute a portion of the modified version of process 700 corresponding to the second portion 1011, then this results in a cache miss, which causes a delay for the completion of the checksum computed by the modified version of process 700. Therefore, while the execution corresponding to FIGS. 9 and 10 result in the same state value being transmitted by component 714 to verifying entity 806, the time of the computation of the state value, which corresponds to the checksum, is greater for the modified version of process 700, shown in FIG. 10, than it is for the unmodified version of process 700, shown in FIG. 9.

Figure 11:
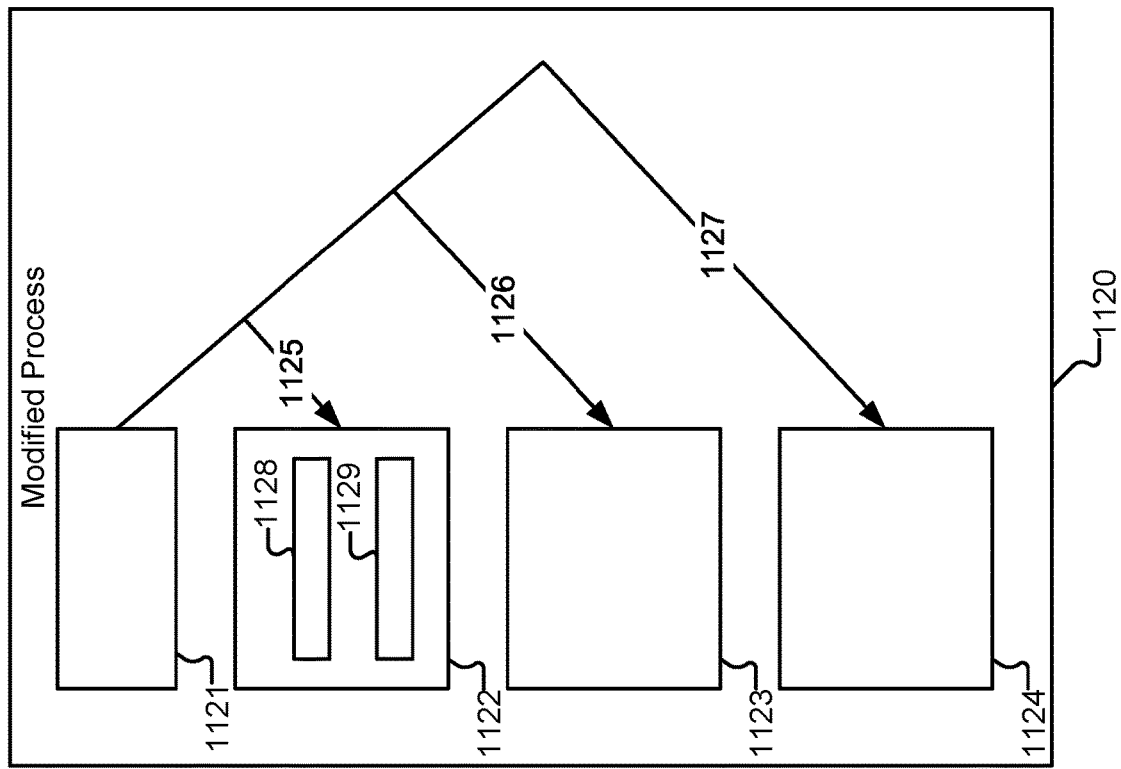
FIG. 11 is a flow diagram illustrating a portion of an auditing or checksum process.
Figure 11:
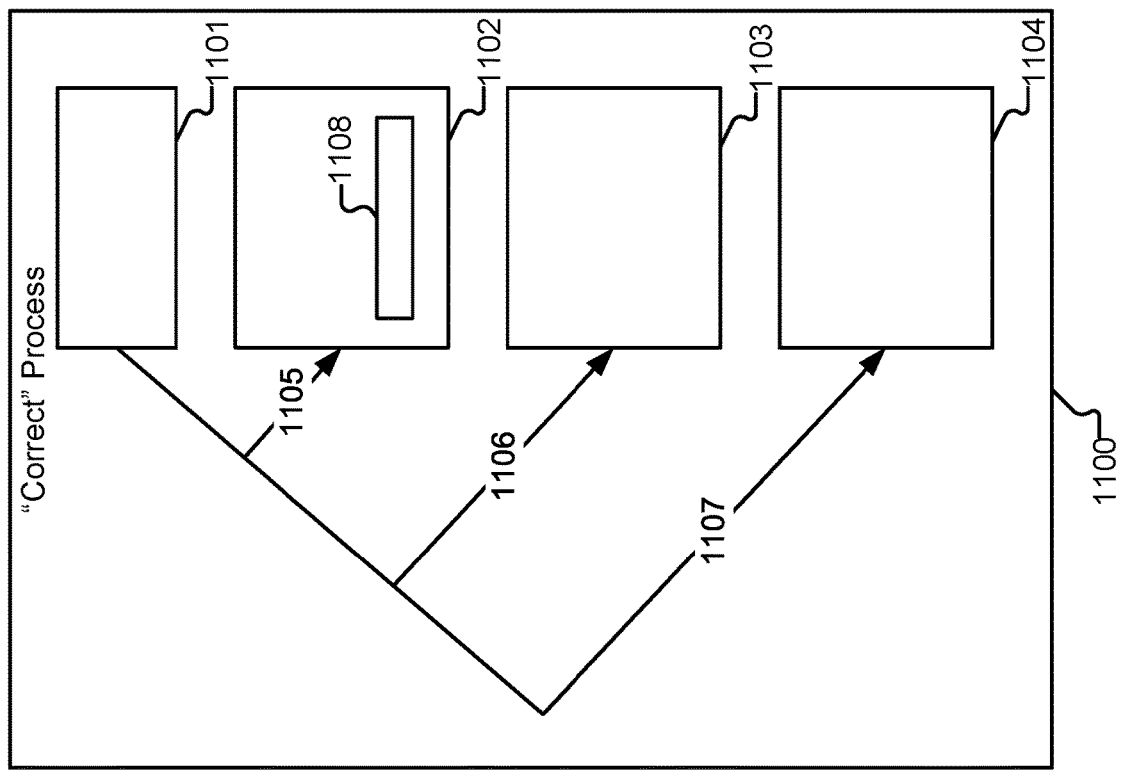

FIG. 11 is a flow diagram illustrating a portion of an auditing or checksum process. The example of FIG. 11 shows a portion 1100 of the "correct" process 700, and a corresponding portion 1120 of a modified version of process 700. In the example shown, branch unit 1101 performs a branch based on a branch location value, where a first branch option 1105 leads to a first element 1102, a second branch option 1106 leads to a second element 1103, and a third branch option 1107 leads to a third element 1104. In some embodiments, first element 1102 includes an instruction or data value 1108 that is considered undesirable to an adversary. The adversary may create the modified version of process 700 to avoid the undesirable instruction or data value 1108. In this example, the modified version 1120 includes a branch unit 1121 that performs a branch based on a branch location value, where a first branch option 1125 leads to a first element 1122, a second branch option 1126 leads to a second element 1123, and a third branch option 1127 leads to a third element 1124. In some embodiments, element 1123 corresponds to element 1103 and element 1124 corresponds to element 1104. In some embodiments, element 1122 corresponds to element 1102, but includes, instead of instruction or data value 1108, the instruction or data values 1128 and 1129, where instruction or data values 1128 and 1129 may require more storage than instruction or data value 1108. This may require the distance between location 1126 and location 1125 to be greater than the distance between location 1106 and location 1105. In some embodiments, to maintain an algorithmic branch strategy in which a branch is computed and performed using one branch instruction only, as in branch unit 1101, this may require the distance between location 1127 and location 1126 to be the same as the distance between location 1126 and location 1125. Therefore, in spite of the fact that elements 1123 and 1124 may not need to have additional instructions or data values compared to elements 1103 and 1104, the space that they need to take up in memory is still increased. While in some embodiments this space may be used to store other information, this may not helpful for the adversary since the unused space is relatively small, and accessing it would require additional branching, which takes both space and time. Thus, a small increase of the size of element 1122, compared to element 1102 has an avalanche effect. In some embodiments, the avalanche effect is expressed in that the difference between the space needed to represent portion 1120 of the modified version of process 700 and the space needed to represent portion 1101 of the process 700 is greater than the difference between the space needed to represent element 1122 and the space needed to represent element 1102. In some embodiments, this avalanche effect is caused by the use of a first sequence of instructions that, if deemed undesirable to an adversary, cannot be replaced by a second sequence of instructions, where the space required to represent the second sequence is greater than the space required to represent the first sequence. An example of such a sequence is a sequence of two instructions in which a data pointer is loaded and then used to update a state value. If an adversary wishes not to use the true data pointer, but instead another location that is an offset of the true data pointer, then the adversary has to add at least one instruction between the first and second instruction, in which the loaded data pointer value is modified before this modified value is used to update the state value. In one embodiment, the difference in location between two elements, e.g., location 1106 minus location 1105, is a power of two. This makes the computation of the branching location from a stored value computationally very efficient, as the stored value is simply shifted left some number of bits; alternatively, a branching location may be generated from a stored value simply by taking a logical AND with the value and a bit pattern that extracts a location offset from the branching location associated with step 1101.

Figure 12:
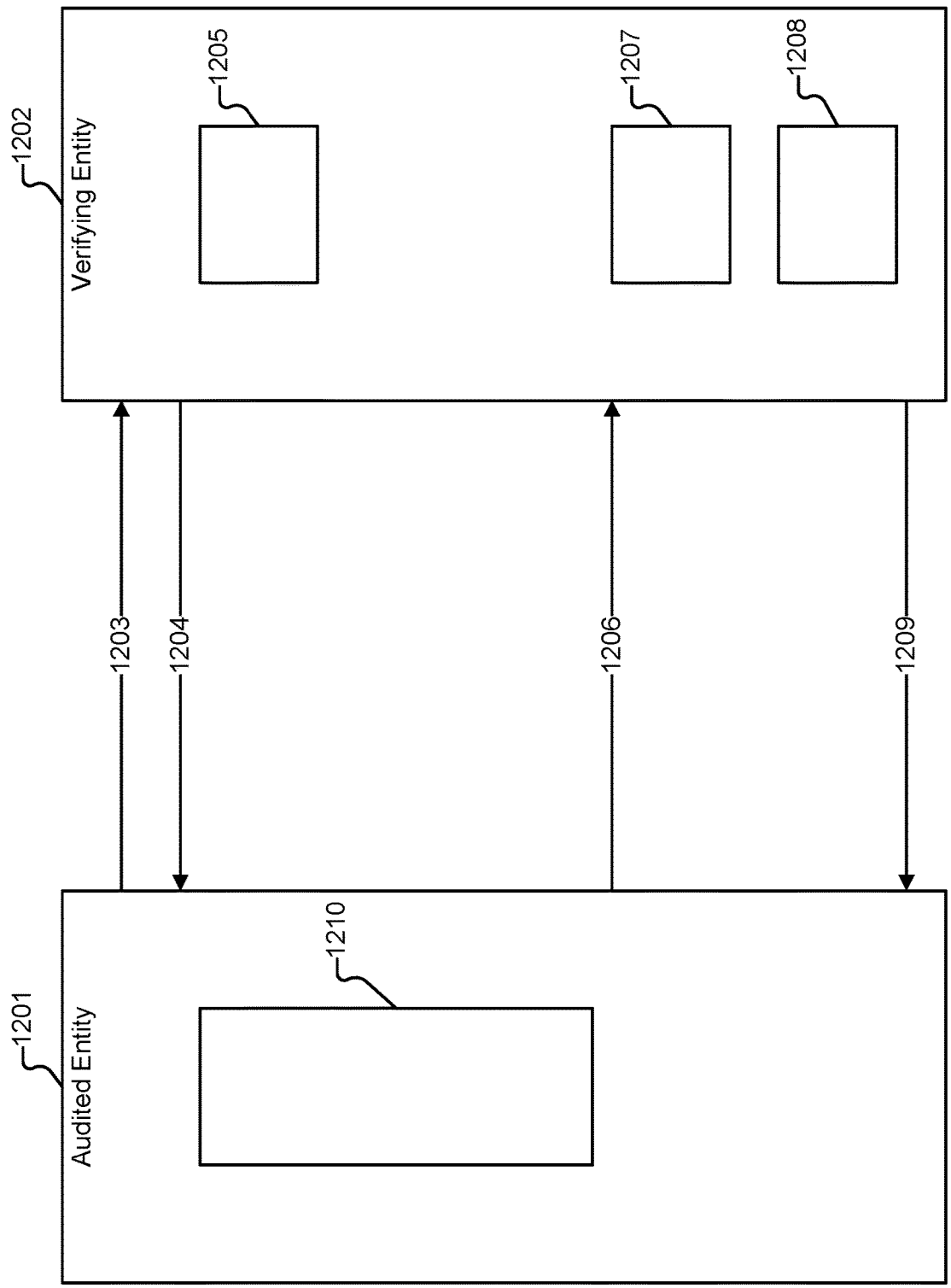
FIG. 12 illustrates example embodiments of an audited entity 1201 and a verifying entity 1202.

FIG. 12 illustrates example embodiments of an audited entity 1201 and a verifying entity 1202. In the example shown, in a first communication step 1203, the audited entity 1201 transmits information to the verifying entity 1202 relating to its identity, the program counter, and the data pointer. In some embodiments, the verifying identity responds with a seed value 1204, corresponding to a second communication step. In some embodiments, the seed value is used to instantiate the state value used by the audited entity to compute a checksum. In some embodiments, the verifying entity records 1205 the time at which the second communication step 1204 took place. In some embodiments, this is done either by recording the time right before the second communication 1204 or right after it took place. In some embodiments, the audited entity computes 1210 the checksum based at least in part on the seed value received in the second communication 1204. In some embodiments, after the checksum has been computed, it is transmitted from the audited entity 1201 to the verifying entity 1202 in a third communication step 1206. In some embodiments, the verifying entity records the time right after communication step 1206 in step 1207. In some embodiments, the verifying entity then determines 1208 whether the received checksum is correct and whether the time difference between the time recorded in step 1207 and the time recorded in step 1205 exceeds the expected time, which, in some embodiments, is a value associated with the identity of the audited entity 1201. In some embodiments, if the verifying entity 1202 determines that the audited entity 1201 is free from malware, then the verifying identity transmits a value in communication step 1209, where the transmitted value enables the audited entity access to a resource. In some embodiments, if the verifying entity determines that the audited entity is not free from malware, then it does not send this value, thereby not enabling access to the resource. In one embodiment, the verifying entity resides in a protected area that is co-located with the verified entity; in another embodiment, the two entities are located far from each other. In one embodiment, a value associated with malware-freeness is not transmitted in step 1209; in this example embodiment, the resource is maintained directly by verifying entity 1202, and instead of sending the value to give access, the verifying entity 1202 transmits 1209 the result of accessing the resource, or otherwise performs an action that accesses the resource. An example of such an action is to authenticate a request and transmit the authenticated request to a third party. In some embodiments, if the audited entity requesting this service is not deemed to be free from malware, then the authenticated request will not be sent, but if the audited entity requesting the service is deemed to be free from malware, then the authenticated request will be sent.

Figure 13:
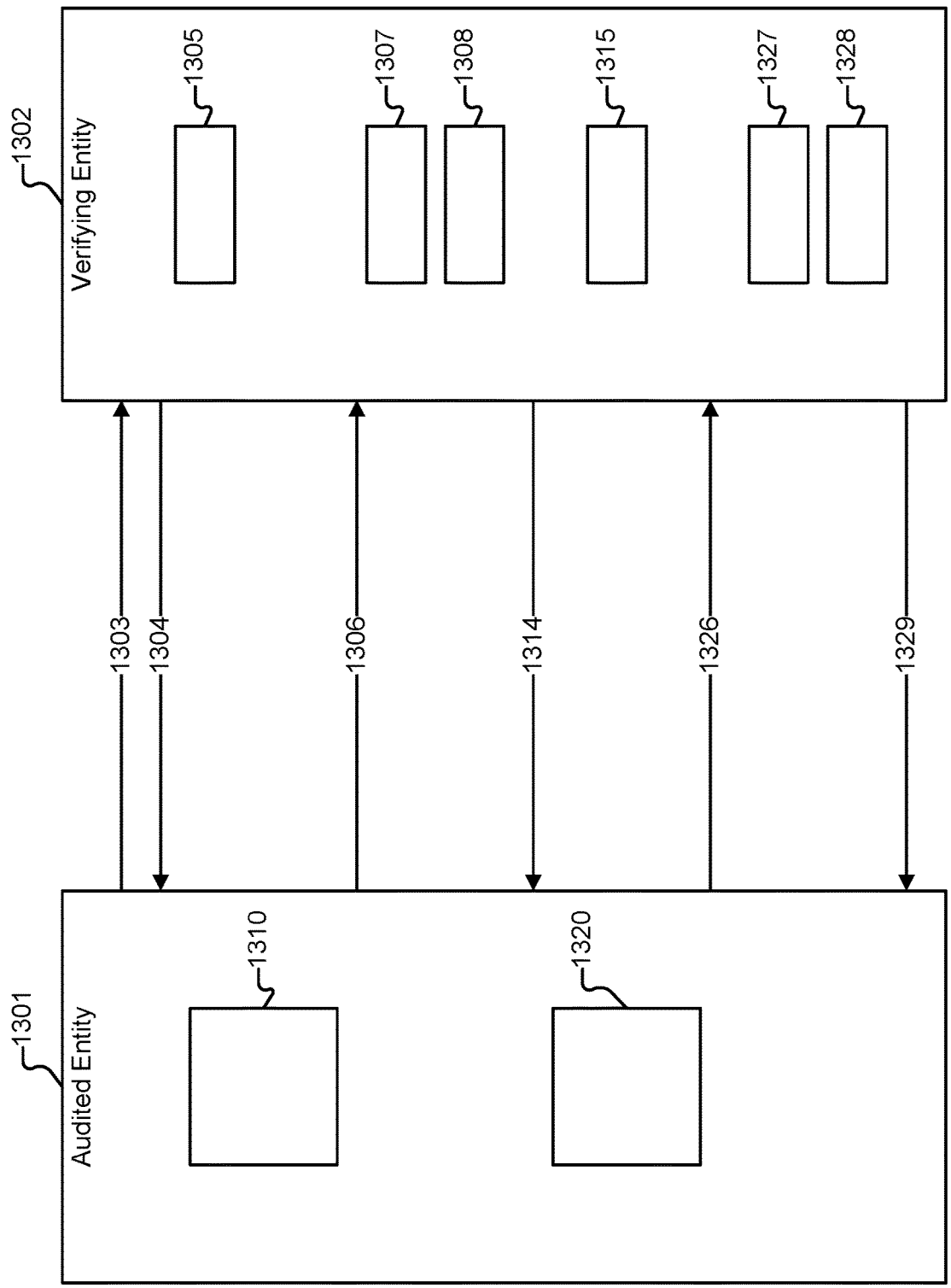
FIG. 13 illustrates an example embodiment of a checksum computation being iterated twice.

FIG. 13 illustrates an example embodiment of a checksum computation being iterated twice. In some embodiments, audited entity 1301 corresponds to audited entity 1201, and verifying entity 1302 corresponds to verifying entity 1202. In some embodiments, the communication 1303 corresponds with communication 1203, and communication 1304 with communication 1204. In some embodiments, communication 1306 corresponds with communication 1206. In some embodiments, the measuring of time at 1305 and 1307 corresponds to the measuring of time at 1205 and 1207, and the checksum computation 1310 corresponds to the checksum computation 1210. In some embodiments, the determination 1308 corresponds to determination 1208. In some embodiments, if determination 1308 indicates that there is no malware affecting audited entity 1301, then the verifying entity may cancel the remaining checksum computation and proceed to step 1329. Alternatively, it may simply proceed by sending a new seed value in communication step 1314. In some embodiments, this is used as input to the checksum computation 1320, which concludes by the audited entity 1301 transmitting the checksum result to the verifying entity in communication step 1326. In some embodiments, timing measurements are taken at steps 1315 and 1327, and a determination 1328 is made, based on the time difference between the time measured in step 1327 and the time measured in step 1315. In some embodiments, if the determination is that the audited entity 1301 is free from malware, then verifying entity 1302 transmits a response in communication step 1329, giving access to a resource requested by audited entity 1301.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory;
one or more processors coupled to the memory; and
a verifier configured to:
receive (1) a first checksum value generated by at least one processor of a target entity executing first checksum code, and (2) an identity value associated with the target entity, wherein the target entity is in communication with the verifier;
compute, at least in part by the verifier executing second checksum code, a second checksum value;
wherein the first checksum code and the second checksum code executed, respectively, by the target entity and the verifier each comprise an accumulator portion and a control portion, and wherein the accumulator portion comprises a non-linear accumulator that modifies a checksum state, and wherein the control portion performs an action based at least in part on the modified checksum state;
perform a security determination based on:
(1) a time elapsed between communication of a seed and communication of the first checksum value,
(2) the identity value, and
(3) a comparison between the first checksum value and the second checksum value; and
subsequent to completion of a verification based at least in part on one or more digital signatures, perform a set of security actions based at least in part on the security determination, wherein the set of security actions comprises (1) enabling the at least one processor of the target entity to access a resource, and (2) causing the at least one processor of the target entity to obtain access to a cryptographic key.

2. The system of claim 1 wherein the action comprises a branch.

3. The system of claim 1 wherein at least one of the target entity or the verifier comprises a split cache.

4. The system of claim 1 wherein the target entity comprises at least one of a server, a desktop computer, or a wireless device.

5. The system of claim 1 wherein the non-linear accumulator comprises a cryptographic hash function.

6. The system of claim 1 wherein the non-linear accumulator comprises two non-commutative operations.

7. The system of claim 1 wherein the first checksum code executed on the at least one processor of the target entity is written to be larger than an L1 cache associated with the at least one processor of the target entity.

8. The system of claim 1 wherein the first checksum value is based at least in part on a challenge value sent by the verifier.

9. The system of claim 1 wherein in response to the security determination, the at least one processor of the target entity receives a result of an operation.

10. The system of claim 1 wherein based at least in part on the security determination, the target entity is configured to verify another target entity.

11. The system of claim 1 wherein executing of the first checksum code causes flushing of an L1 cache.

12. A method, comprising:
receiving, at a verifier, (1) a first checksum value generated by at least one processor of a target entity executing first checksum code, and (2) an identity value associated with the target entity, wherein the target entity is in communication with the verifier;
computing, at least in part by the verifier executing second checksum code using one or more processors, a second checksum value;
wherein the first checksum code and the second checksum code executed, respectively, by the target entity and the verifier each comprise an accumulator portion and a control portion, and wherein the accumulator portion comprises a non-linear accumulator that modifies a checksum state, and wherein the control portion performs an action based at least in part on the modified checksum state;
performing a security determination based on:
(1) a time elapsed between communication of a seed and communication of the first checksum value,
(2) the identity value, and
(3) a comparison between the first checksum value and the second checksum value; and
subsequent to completion of a verification based at least in part on one or more digital signatures, performing a set of security actions based at least in part on the security determination, wherein the set of security actions comprises (1) enabling the at least one processor of the target entity to access a resource, and (2) causing the at least one processor of the target entity to obtain access to a cryptographic key.

13. The method of claim 12 wherein the action comprises a branch.

14. The method of claim 12 wherein at least one of the target entity or the verifier comprises a split cache.

15. The method of claim 12 wherein the target entity comprises at least one of a server, a desktop computer, or a wireless device.

16. The method of claim 12 wherein the non-linear accumulator comprises a cryptographic hash function.

17. The method of claim 12 wherein the non-linear accumulator comprises two non-commutative operations.

18. The method of claim 12 wherein the first checksum code executed on the at least one processor of the target entity is written to be larger than an L1 cache associated with the at least one processor of the target entity.

19. The method of claim 12 wherein the first checksum value is based at least in part on a challenge value sent by the verifier.

20. The method of claim 12 wherein in response to the security determination, the at least one processor of the target entity receives a result of an operation.

21. The method of claim 12 wherein based at least in part on the security determination, the target entity is configured to verify another target entity.

22. The method of claim 12 wherein executing of the first checksum code causes flushing of an L1 cache.

23. A computer program product embodied in a non-transitory computer readable storage medium and comprising computer instructions for:
receiving, at a verifier, (1) a first checksum value generated by at least one processor of a target entity executing first checksum code, and (2) an identity value associated with the target entity, wherein the target entity is in communication with the verifier;
computing, at least in part by the verifier executing second checksum code using one or more processors, a second checksum value;
wherein the first checksum code and the second checksum code executed, respectively, by the target entity and the verifier each comprise an accumulator portion and a control portion, and wherein the accumulator portion comprises a non-linear accumulator that modifies a checksum state, and wherein the control portion performs an action based at least in part on the modified checksum state;

performing a security determination based on:
- (1) a time elapsed between communication of a seed and communication of the first checksum value,
- (2) the identity value, and
- (3) a comparison between the first checksum value and the second checksum value; and subsequent to completion of a verification based at least in part on one or more digital signatures, performing a set of security actions based at least in part on the security determination, wherein the set of security actions comprises (1) enabling the at least one processor of the target entity to access a resource, and (2) causing the at least one processor of the target entity to obtain access to a cryptographic key.

* * * * *